United States Patent
Kim et al.

(10) Patent No.: US 12,315,939 B2
(45) Date of Patent: May 27, 2025

(54) METAL-CARBON COMPOSITE CATALYST, PREPARATION METHOD THEREFOR, AND ZINC-AIR BATTERY COMPRISING SAME

(71) Applicant: INDUSTRY-UNIVERSITY COOPERATION FOUNDATION HANYANG UNIVERSITY ERICA CAMPUS, Ansan-Si (KR)

(72) Inventors: Jong Ho Kim, Ansan-si (KR); Jung Hyun Park, Ansan-si (KR)

(73) Assignee: INDUSTRY-UNIVERSITY COOPERATION FOUNDATION HANYANG UNIVERSITY ERICA CAMPUS, Ansan-Si (KR)

( * ) Notice: Subject to any disclaimer, the term of this patent is extended or adjusted under 35 U.S.C. 154(b) by 569 days.

(21) Appl. No.: 17/754,232

(22) PCT Filed: Oct. 16, 2020

(86) PCT No.: PCT/KR2020/014165
§ 371 (c)(1),
(2) Date: Mar. 28, 2022

(87) PCT Pub. No.: WO2021/075906
PCT Pub. Date: Apr. 22, 2021

(65) Prior Publication Data
US 2022/0376267 A1 Nov. 24, 2022

(30) Foreign Application Priority Data
Oct. 16, 2019 (KR) .................. 10-2019-0128258

(51) Int. Cl.
*H01M 4/86* (2006.01)
*H01M 4/88* (2006.01)
(Continued)

(52) U.S. Cl.
CPC ....... *H01M 4/8652* (2013.01); *H01M 4/8882* (2013.01); *H01M 4/9041* (2013.01);
(Continued)

(58) Field of Classification Search
None
See application file for complete search history.

(56) References Cited

U.S. PATENT DOCUMENTS 9,944,850 B2  4/2018  Jo et al.
2018/0305827 A1 * 10/2018  Wang ................ B01J 35/59

FOREIGN PATENT DOCUMENTS

CN   104289249 A  *  1/2015
CN   108970577 A  * 12/2018  .......... B01J 20/0225
(Continued)

OTHER PUBLICATIONS

Machine Translation of CN 108970577A (Year: 2018).*
(Continued)

*Primary Examiner* — Gregg Cantelmo
(74) *Attorney, Agent, or Firm* — Finch & Maloney PLLC

(57) ABSTRACT

A method for preparing a metal-carbon composite catalyst comprises the steps of: preparing a source material comprising a metal precursor and a monomer, which comprises a methylpyrrolidone (NMP); heat treating the source material so as to prepare an intermediate; and carbonizing the intermediate so as to prepare a carbon nanocatalyst in which the metal of the metal precursor is coupled to a carbon matrix structure, wherein, according to whether the source material comprises an organic additive, the type of organic additive, and the type of metal precursor, the carbon matrix structure has a carbon sheet structure and/or a carbon porous body structure, and the metal can be metal ions and/or metal particles. The metal-carbon composite catalyst can have
(Continued)

high ORR and OER characteristics, and thus can be used as a cathode material for a zinc-air battery.

8 Claims, 36 Drawing Sheets

(51) Int. Cl.
  *H01M 4/90* (2006.01)
  *H01M 4/96* (2006.01)
  *H01M 12/06* (2006.01)
(52) U.S. Cl.
  CPC .......... *H01M 4/9083* (2013.01); *H01M 4/96* (2013.01); *H01M 12/06* (2013.01)

(56) References Cited

FOREIGN PATENT DOCUMENTS

| | | | |
|---|---|---|---|
| JP | 4556743 B2 | 10/2010 | |
| JP | 2015-220036 A | 12/2015 | |
| KR | 10-2012-0106137 A | 9/2012 | |
| KR | 10-1397417 B1 | 5/2014 | |
| KR | 10-2016-0091310 A | 8/2016 | |
| KR | 10-2017-0023305 A | 3/2017 | |
| KR | 10-2017-0027613 A | 3/2017 | |
| KR | 10-1723627 B1 | 4/2017 | |
| KR | 10-2017-0062221 A | 6/2017 | |
| KR | 10-2019-0058957 A | 5/2019 | |
| KR | 20200043192 A | * | 4/2020 |

OTHER PUBLICATIONS

Machine Translation of CN 104289249A (Year: 2015).*
Machine Translation of KR 20200043192A (Year: 2020).*
Inagaki et al., "Nitrogen-doped carbon materials", Carbon, 132, pp. 104-140 (2018).
International Search Report for International Application No. PCT/KR2020/014165 dated Jan. 29, 2021, 3 pages.
Written Opinion of the International Searching Authority for International Application No. PCT/KR2020/014165 dated Jan. 29, 2021, 5 pages.

* cited by examiner

110

120

130

140

METAL-CARBON COMPOSITE CATALYST, PREPARATION METHOD THEREFOR, AND ZINC-AIR BATTERY COMPRISING SAME

TECHNICAL FIELD

The present application relates to a metal-carbon composite catalyst, a preparation method therefor, and a zinc-air battery including the same, and more specifically, to a metal-carbon composite catalyst, which includes a carbon matrix structure, and a metal coupled to the carbon matrix structure, a preparation method therefor, and a zinc-air battery including the same.

BACKGROUND ART

Since a carbon-based catalyst is mainly prepared through a random carbonization step, a method for controlling the structure has rarely been developed. Accordingly, an acid or base treatment process is further performed on the prepared carbon-based catalyst, so that the structure is controlled in the distribution of pores, the size of pores or the like. However, since the process of acid or base treatment further requires the cost and time, and it is not eco-friendly and is harmful to the human body, alternative solutions are required.

The carbon-based catalyst is used in various fields such as organic synthesis, decomposition of various organic materials such as carbon dioxide, secondary batteries, or fuel cells.

A metal-air battery refers to a battery using a metal (such as lithium or zinc) as a negative electrode and oxygen in the atmosphere as a positive electrode active material. The positive electrode is manufactured by combining a porous carbon body and a catalyst on or inside the carbon porous body in order to easily introduce oxygen into the battery. The catalyst performs a reduction reaction and a production reaction of oxygen, and accordingly, a metal-air battery can be driven.

Recently, platinum (Pt) or an alloy of platinum and ruthenium (Ru) is mainly used as a catalyst, however, it is expensive. Accordingly, researches on preparing a catalyst by using a relatively inexpensive metal such as cobalt, zinc, iron, or manganese or an oxide of the metal are being conducted. Further, researches are being conducted on increasing the surface area of the carbon porous body in order to increase the catalytic activity.

For example, Korean Patent Registration No. 10-1275936 (Application No.: 10-2011-0024035) discloses a method for preparing a high-performance manganese oxide catalyst for zinc-air batteries using carbon nanotubes, which includes the steps of: A) dispersing carbon nanotubes in any one surfactant selected from sodium dodecylbenzene sulfonate (SDBS), polydiallydimethylammonium chloride (PDDA), polyvinylpyrrolidone (PVP), and polyethylene glycol (PEG); B) dissolving a manganese oxide precursor in a solvent at room temperature to form manganese oxide; C) mixing the solution prepared in steps A) and B) to impregnate the manganese oxide in the carbon nanotubes; D) separating manganese oxide catalyst powder from the solution mixed in step C) by centrifugation; and E) washing and drying the separated manganese oxide, wherein, in step A), the carbon nanotubes dispersed in the surfactant are added to have a concentration of 0.01 to 1 wt % based on the total solution, and, in step C), the carbon nanotubes dispersed in the surfactant and the manganese oxide solution are mixed in the volume ratio of 0.5 to 1.5:1 to 3.

DISCLOSURE

Technical Problem

One technical problem to be solved by the present invention is to provide a metal-carbon composite catalyst, a preparation method therefor, and a zinc-air battery including the same, in which the metal-carbon composite catalyst includes a carbon matrix structure controlled in configuration and porosity according to a type of an organic precursor.

Another technical problem to be solved by the present invention is to provide a metal-carbon composite catalyst, a preparation method therefor, and a zinc-air battery including the same, in which the metal-carbon composite catalyst has various configurations and compositions in a single preparation process.

Another technical problem to be solved by the present invention is to provide a metal-carbon composite catalyst, a preparation method therefor, and a zinc-air battery including the same, in which the metal-carbon composite catalyst has stability to an oxygen reduction reaction and an oxygen evolution reaction.

The technical problems to be solved by the present invention are not limited to the above.

Technical Solution

In order to solve the above-mentioned technical problems, the present application provides a method for preparing a metal-carbon composite catalyst.

According to one embodiment, the method for preparing a metal-carbon composite catalyst includes the steps of: providing for a source material including a monomer containing methylpyrrolidone (NMP), and a metal precursor; heat treating the source material to prepare an intermediate product; and carbonizing the intermediate product to prepare a carbon nanocatalyst in which a metal of the metal precursor is coupled to a carbon matrix structure, wherein, according to an existence of an organic additive in the source material, a type of the organic additive, and a type of the metal precursor, the carbon matrix structure has at least one configuration of a carbon sheet or a carbon porous body, and the metal includes at least one of metal ions and metal particles.

According to one embodiment, when the source material does not include the organic additive, the carbon matrix structure may have a configuration in which a plurality of nitrogen-doped carbon sheets are laminated, and the metal may include metal ions bonded to the nitrogen of the carbon sheet.

According to one embodiment, the source material may include the organic additive, the organic additive may include 4-aminopyridine, the carbon matrix structure may be a nitrogen-doped carbon sheet, and the metal may include the metal particles bonded to the nitrogen of the carbon sheet.

According to one embodiment, the source material may include the organic additive, the organic additive may include pyrrole-2-carboxylic acid, the metal precursor may include cobalt sulfate ($CoSO_4$), the carbon matrix structure may include the carbon porous body having a configuration of nitrogen-doped porous carbon spheres, and the metal may include the metal ions bonded to the nitrogen.

According to one embodiment, the source material may include the organic additive, the organic additive may include pyrrole-2-carboxylic acid, the metal precursor may include cobalt cyanide ($Co(CN)_2$), the carbon matrix structure may include the carbon porous body having a configuration of a nitrogen-doped porous carbon sponge, and the metal may include the metal particles bonded to the nitrogen.

According to one embodiment, the step of preparing the intermediate product may include heat treating the source material in an oxygen atmosphere to prepare a radical reaction initiator from the monomer through the oxygen as a medium; and preparing the intermediate product with a radical polymerization reaction by the radical reaction initiator.

According to one embodiment, the monomer may include an organic additive containing at least one of 4-aminopyridine, or pyrrole-2-carboxylic acid.

According to one embodiment, the metal precursor may include at least one of cobalt sulfate ($CoSO_4$), nickel sulfate ($NiSO_4$), manganese sulfate ($MnSO_4$), iron sulfate ($FeSO_4$), or cobalt cyanide ($Co(CN)_2$).

In order to solve the above-mentioned technical problems, the present application provides a metal-carbon composite catalyst.

According to one embodiment, the metal-carbon composite catalyst includes a nitrogen-doped carbon sheet, and a metal including at least one of metal ions or metal particles bonded to the carbon sheet, wherein the carbon sheet includes more pyrrolic nitrogen (pyrrolic N) than graphite nitrogen (graphitic N), and the metal includes at least one of cobalt, nickel, manganese or iron.

According to one embodiment, the nitrogen-doped carbon sheet may have a laminated configuration, and the metal may include metal ions bonded to the nitrogen of the carbon sheet.

According to one embodiment, the metal may include metal particles bonded to the nitrogen of the carbon sheet, in which the metal particles may include metal nanoparticle cores, and carbon shells covering surfaces of the cores.

According to one embodiment, the metal-carbon composite catalyst may include a nitrogen-doped carbon porous body, and a metal including at least one of metal ions bonded to the carbon porous body or metal particles impregnated in pores of the carbon porous body, in which the carbon porous body may include more pyridinic nitrogen (pyridinic N) than pyrrolic nitrogen (pyrrolic N), and the metal may include at least one metal of cobalt, nickel, manganese, or iron.

According to one embodiment, the carbon porous body may include a porous carbon sphere, and the metal may include metal ions bonded to the nitrogen of the porous carbon sphere.

According to one embodiment, the carbon porous body may include a porous carbon sponge, and the metal may include metal particles bonded to the nitrogen of the carbon sponge, in which the metal particles may include metal nanoparticle cores, and carbon shells covering surfaces of the cores.

In order to solve the above-mentioned technical problems, the present application provides a zinc-air battery.

According to one embodiment, the zinc-air battery includes a positive electrode using oxygen as a positive electrode active material; a negative electrode including a zinc metal; and an electrolyte disposed between the positive electrode and the negative electrode, wherein the positive electrode includes a catalyst layer on a surface thereof in contact with the electrolyte, and the catalyst layer includes the metal-carbon composite catalyst.

Advantageous Effects

The method for preparing a metal-carbon composite catalyst according to the embodiments of the present invention may include: providing for a source material including a monomer containing methylpyrrolidone (NMP), and a metal precursor; heat treating the source material to prepare an intermediate product; and carbonizing the intermediate product to prepare a carbon nanocatalyst in which a metal of the metal precursor is coupled to a carbon matrix structure.

The source material may further include an organic additive. Thus, according to an existence of an organic additive in the source material, a type of the organic additive, and a type of the metal precursor, the carbon matrix structure may have at least one configuration of a nitrogen-doped carbon sheet or a nitrogen-doped carbon porous body, and the metal may include at least one of metal ions or metal particles.

Specifically, the carbon matrix structure may include the nitrogen which is at least one of pyridic nitrogen, pyrrolidic nitrogen, and graphitic nitrogen, and the metal may be bonded to the nitrogen of the carbon matrix structure. Accordingly, a bonding force between the metal and the carbon matrix structure may vary depending on the type of nitrogen included in the carbon matrix structure. Thus, the forms of the carbon matrix structure and the metal may be determined.

As described above, the metal may be bonded to the nitrogen. In other words, the metal-carbon composite catalyst may include a metal-nitrogen bond, and the metal-nitrogen bond can be provided as an active site in which the oxygen reduction reaction is performed. In addition, the metal can serve as a catalyst for the oxygen generation reaction.

Accordingly, the metal-carbon composite catalyst can be easily used as a catalyst for the oxygen reduction reaction and the oxygen evolution reaction. Thus, the metal-carbon composite catalyst can be used as a catalyst for a zinc-air battery or a fuel battery, and can be provided as a catalyst for the battery which is reusable, that is, having a long lifespan.

BEST MODE

Mode for Invention

Hereinafter, preferred embodiments of the present invention will be described in detail with reference to the accompanying drawings. However, the technical idea of the present invention is not limited to the exemplary embodiments described herein and may be embodied in other forms. Further, the embodiments are provided to enable contents disclosed herein to be thorough and complete and provided to enable those skilled in the art to fully understand the idea of the present invention.

Herein, when one component is mentioned as being on other component, it signifies that the one component may be placed directly on the other component or a third component may be interposed therebetween. In addition, in drawings, thicknesses of layers and areas may be exaggerated to effectively describe the technology of the present invention.

In addition, although terms such as first, second and third are used to describe various components in various embodiments of the present specification, the components will not be limited by the terms. The above terms are used merely to distinguish one component from another. Accordingly, a first component referred to in one embodiment may be referred to as a second component in another embodiment. Each embodiment described and illustrated herein may also include a complementary embodiment. In addition, the term "and/or" is used herein to include at least one of the components listed before and after the term.

The singular expression herein includes a plural expression unless the context clearly specifies otherwise. In addition, it will be understood that the term such as "include" or "have" herein is intended to designate the presence of feature, number, step, component, or a combination thereof recited in the specification, and does not preclude the possibility of the presence or addition of one or more other features, numbers, steps, components, or combinations thereof.

In addition, in the following description of the embodiments of the present invention, the detailed description of known functions and configurations incorporated herein will be omitted when it possibly makes the subject matter of the present invention unclear unnecessarily.

Figure 1:
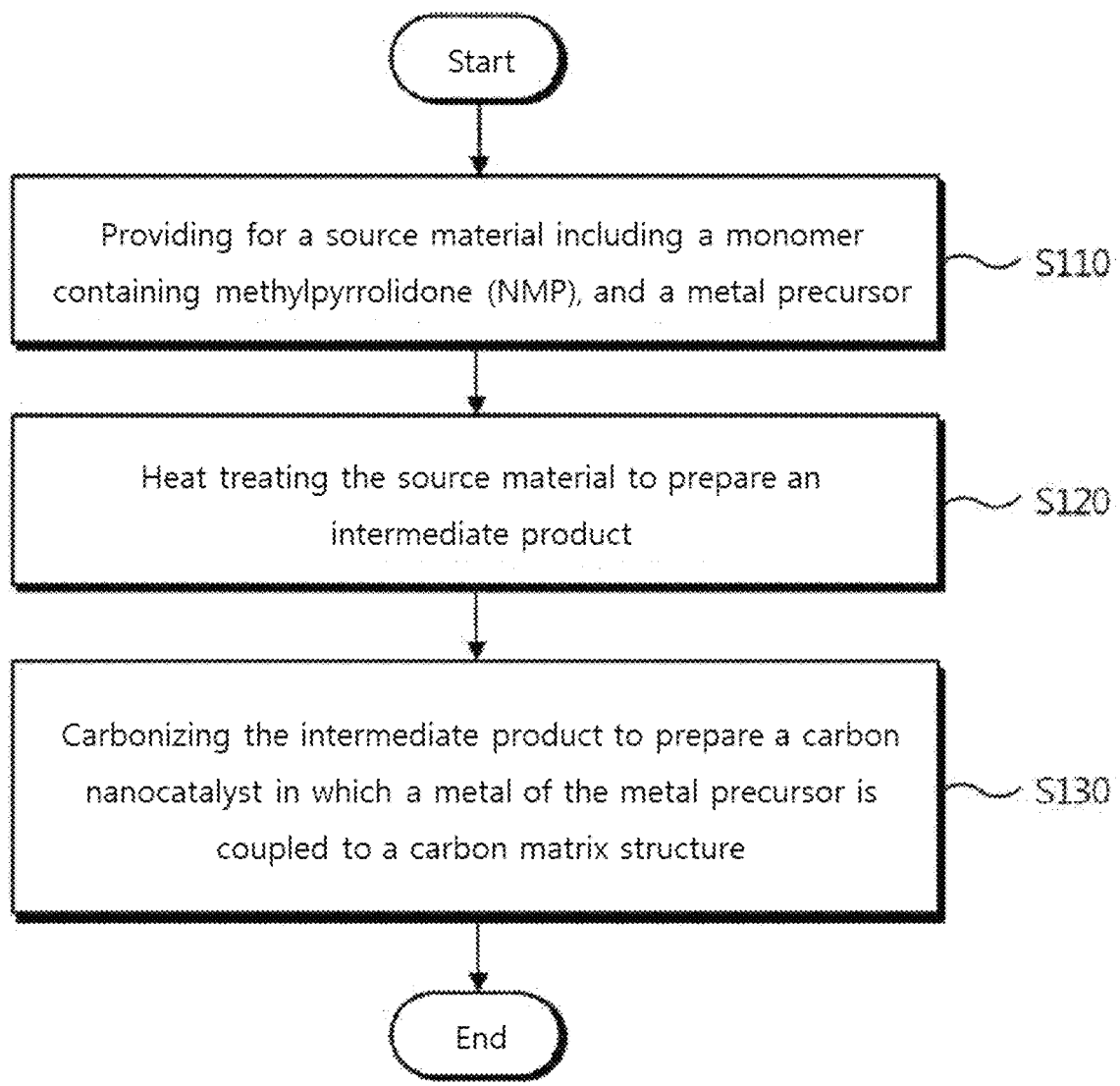
FIG. 1 is a flowchart for explaining a method for preparing a metal-carbon composite catalyst according to the embodiment of the present invention.
Figure 4:
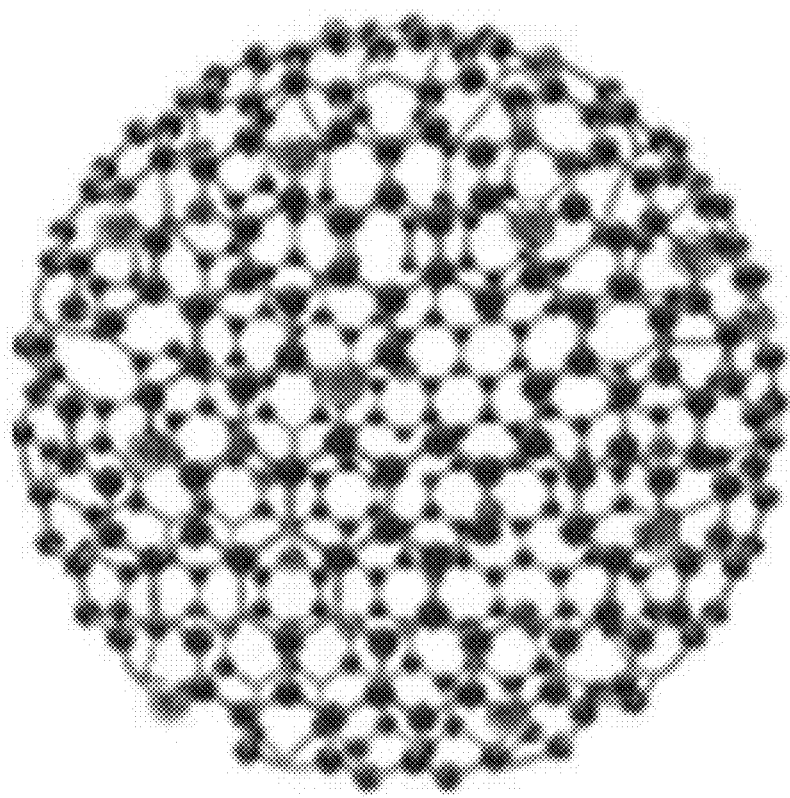
Figure 5:
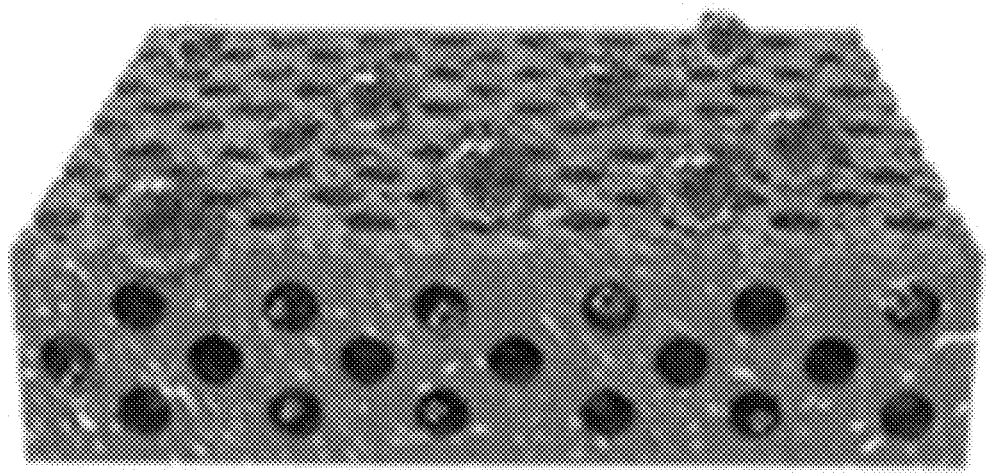
Figure 6:
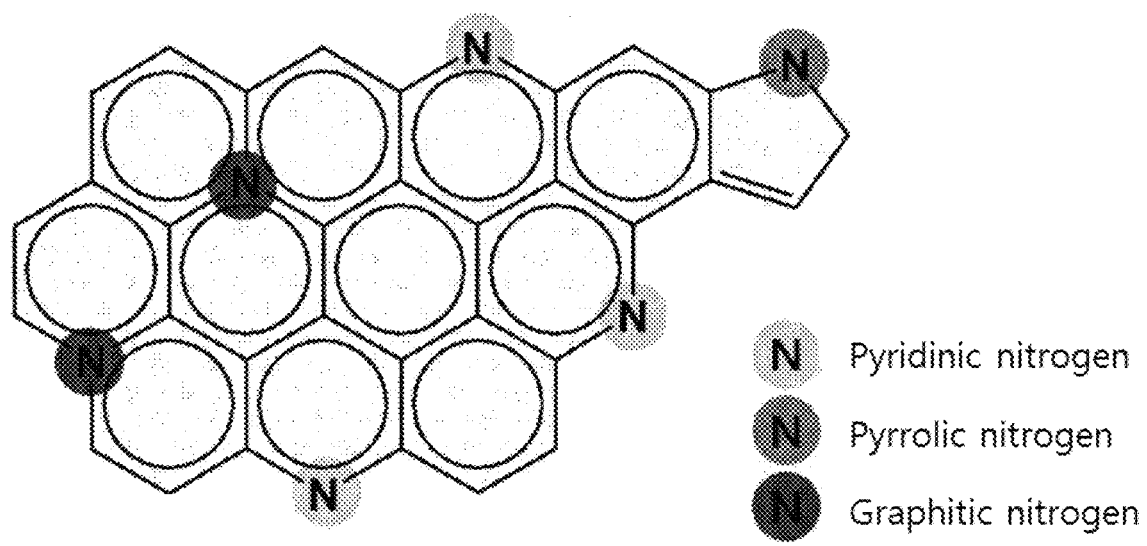
FIG. 6 is a chemical structural formula representing the type of nitrogen contained in the metal-carbon composite catalyst according to the embodiment of the present invention.

FIG. 1 is a flowchart for explaining a method for preparing a metal-carbon composite catalyst according to the embodiment of the present invention. FIGS. 2 to 5 are schematic views of a metal-carbon composite catalyst according to the embodiment of the present invention. FIG. 6 is a chemical structural formula representing the type of nitrogen contained in the metal-carbon composite catalyst according to the embodiment of the present invention.

Referring to FIG. 1, a source material including a monomer containing methylpyrrolidone (NMP), and a metal precursor may be provided (S110).

According to one embodiment, the monomer may be methylpyrrolidone (N-methyl-2-pyrrolidone, NMP) represented by the following <Formula 1>.

<Formula 1>

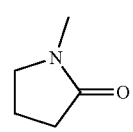

According to one embodiment, the metal precursor may be at least any one of cobalt sulfate ($CoSO_4$), nickel sulfate ($NiSO_4$), manganese sulfate ($MnSO_4$), iron sulfate ($FeSO_4$), or cobalt cyanide ($Co(CN)_2$).

The source material may include an organic additive, wherein the configuration of the metal-carbon composite catalyst described below may be changed depending on addition of the organic additive. Specifically, for example, the organic additive may be at least any one of 4-aminopyridine represented by the following <Formula 2> or pyrrole-2-carboxylic acid represented by the following <Formula 3>.

<Formula 2>

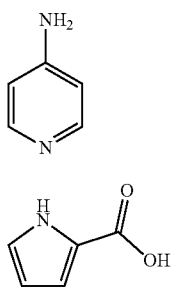

<Formula 3>

The source material may be heat treated to prepare an intermediate product (S120).

Specifically, the intermediate product may be prepared by providing oxygen gas in the source material and simultaneously performing heat treatment. For example, the heat treating step may be performed at a temperature of 200° C. for 24 hours.

According to one embodiment, the source material may not include the organic additive. In this case, at an early stage of the heat treating step, some of the monomers may be converted into radical reaction initiators by the oxygen gas. In other words, radicals may be formed in the monomers through the oxygen gas as a medium.

The monomer may be bonded to the radical reaction initiator prepared in the above-described manner, and radical polymerization may be performed. Accordingly, the intermediate product may be prepared.

According to another embodiment, the source material may include the organic additive. In this case, at the early stage of the heat treating step, at least one of the monomer or the organic additive may be changed into a radical reaction initiator by the oxygen gas. In other words, the radical may be formed in at least one of the monomer or the organic additive by using the oxygen gas as a medium.

Accordingly, the monomer or the organic additive may be bonded to the radical reaction initiator. At the same time, the radical in the radical reaction initiator may move to the monomer or the organic additive bonded to the radical reaction initiator. In other words, the radical may move and form a site to which a new monomer or organic additive may be bonded, and accordingly, the intermediate product may be prepared by the radical polymerization.

Specifically, the intermediate product may include a polymer formed by radical polymerization of at least one of the monomer or the organic additive, and a metal of the metal precursor bonded to the polymer. The metal of the metal precursor may be bonded to a nitrogen element of the polymer, during performing the radical polymerization reaction of the polymer.

Referring to FIGS. 1 to 5, the intermediate product may be carbonized, so that a carbon nanocatalyst in which the metal of the metal precursor is bonded to the carbon matrix structure may be prepared (S130).

According to one embodiment, the metal may be at least any one of cobalt (Co), nickel (Ni), manganese (Mn), or iron (Fe).

As described above, the intermediate product may include the polymer formed by the radical polymerization reaction. The polymer may be carbonized by heat treatment. Accordingly, some of organic substances of the polymer may be removed, and the carbon matrix structure may be formed. At the same time, the metal bonded to the polymer may be removed together with the organic substance or coupled to each other, thereby forming metal particles.

Specifically, for example, the intermediate product may be carbonized by heat treatment for 30 minutes at a temperature of 700° C. to 900° C. under an inert gas atmosphere, and accordingly, the metal-carbon composite catalyst as described above may be prepared. For example, the inert gas may be at least any one of argon, or nitrogen.

In other words, the metal-carbon composite catalyst may include the carbon matrix structure, and the metal bonded to the carbon matrix structure. Specifically, as shown in FIG. 6, the carbon matrix structure may include pyrrolic nitrogen (pyrrolic N), pyridinic nitrogen (pyridinic N), and graphite nitrogen (graphitic N). In general, the pyrrolic nitrogen and the pyridinic nitrogen may have a lone pair of electrons, unlike the graphitic nitrogen. The lone pair of electrons may provide a bonding site with the metal. At this point, unlike the pyridinic nitrogen, the pyrrolic nitrogen may be easily bonded to the metal only when another element (oxygen or another nitrogen) is present in the vicinity or the pyrrolic nitrogen is dense, since the bond strength with the metal is weak even when having the lone pair of electrons. Accordingly, the metal may be mainly bonded to the pyridinic nitrogen of the carbon matrix structure.

The metal-carbon composite catalyst may have a different configuration according to an existence of the organic additive in the source material, a type of the organic additive, and a type of the metal precursor.

According to one embodiment, the metal-carbon composite catalyst, which includes a nitrogen-doped carbon sheet as the carbon matrix structure, and at least one of metal ions or metal particles as the metal, may be prepared. The carbon sheet may include more pyrrolic nitrogen than graphitic nitrogen.

Figure 2:
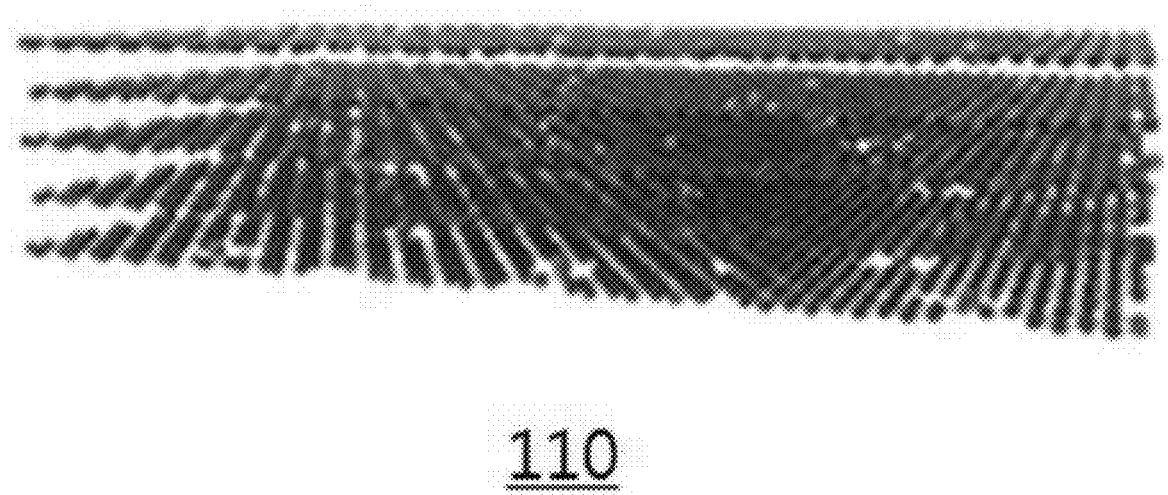
FIGS. 2 to 5 are schematic views of a metal-carbon composite catalyst according to the embodiment of the present invention.

Specifically, for example, the source material may not include the organic additive. Accordingly, as shown in FIG. 2, a metal-carbon composite catalyst 110, which has a first configuration including the carbon matrix structure in which a plurality of nitrogen-doped carbon sheets are laminated and the metal ions bonded to the nitrogen, may be prepared.

Figure 3:
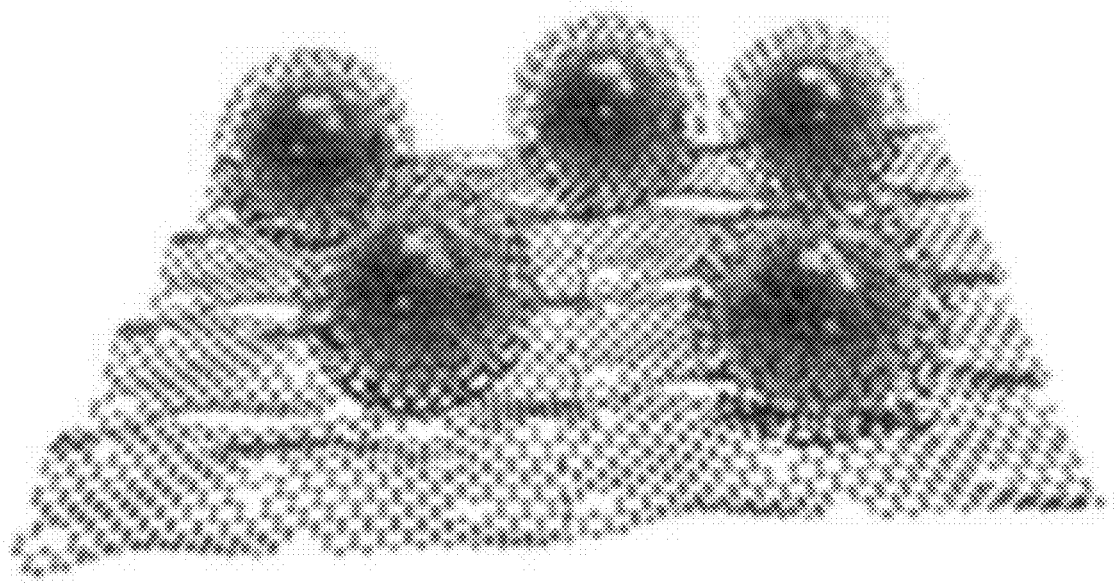

For another example, the source material may include 4-aminopyridine as the organic additive. Accordingly, as shown in FIG. 3, a metal-carbon composite catalyst 120, which has a second configuration including the nitrogen-doped carbon sheet and the metal particles bonded to the nitrogen, may be prepared.

The metal-carbon composite catalyst 110 having the first configuration may include less bond between the metal and the nitrogen (hereinafter, a metal-nitrogen bond) compared to the metal-carbon composite catalyst 120 having the second configuration. In other words, the metal-carbon composite catalyst 110 having the first configuration may have a smaller bonding force between the metal and the nitrogen than that of the metal-carbon composite catalyst having the second configuration.

As described above, when the bonding force between the metal and the nitrogen is low, the metal may be removed together with the organic substance in the step of carbonizing the intermediate product, and accordingly, the metal-carbon composite catalyst 110 having the first configuration may include the metal ions as the metal. Whereas, when the bonding force between the metal and the nitrogen is high, the metal may not be substantially removed in the step of carbonizing the intermediate product, and simultaneously, thermal energy obtained in the carbonizing step may cause bonding between the metals. Accordingly, the metal-carbon composite catalyst (for example, the metal-carbon composite catalyst having the second configuration) having the metal particles larger in size than the metal ions may be prepared. A carbon shell may be formed on a surface of the metal particle. The carbon shell may prevent the metal particle from coming into direct contact with an external material such as oxygen. Accordingly, the stability of the metal particle formed thereon with the carbon shell may be easily improved.

According to another embodiment, the metal-carbon composite catalyst, which includes a nitrogen-doped carbon porous body as the carbon matrix structure, and at least one of metal ions and metal particles as the metal, may be prepared. The carbon porous body may include the pyridinic nitrogen more than the pyrrolic nitrogen. In addition, the carbon porous body may include the pyrrolic nitrogen more than graphitic nitrogen. In other words, the carbon porous body may include nitrogen elements in the order of the pyridinic nitrogen, the pyrrolic nitrogen, and the graphitic nitrogen.

Specifically, for example, the source material may include pyrrole-2-carboxylic acid as the organic additive, and cobalt sulfate as the metal precursor. Accordingly, as shown in FIG. 4, a metal-carbon composite catalyst 130, which has a third configuration including a nitrogen-doped porous carbon sphere (that is, a carbon porous body) and the metal ions bonded to the nitrogen, may be prepared.

For another example, the source material may include pyrrole-2-carboxylic acid as the organic additive, and cobalt cyanide as the metal precursor. Accordingly, as shown in FIG. 5, a metal-carbon composite catalyst 140, which has a fourth configuration including a nitrogen-doped porous carbon sponge (that is, a carbon porous body) and the metal particles bonded to the nitrogen, may be prepared.

As described above, the metal-carbon composite catalyst 130 having the third configuration may include the metal-nitrogen bond less than that of the metal-carbon composite catalyst 140 having the fourth configuration. Accordingly, the metal-carbon composite catalyst 130 having the third configuration may include the metal ions, and the metal-carbon composite catalyst 140 having the fourth configuration may include the metal particles formed after the metals agglomerate. As described above, the metal particle may include a carbon shell on a surface thereof.

Accordingly, the metal-carbon composite catalyst 140 having the second configuration and the fourth configuration may include the metal more than that of the metal-carbon composite catalyst 130 having the first configuration and the third configuration. In other words, the metal-carbon composite catalyst having the metal particles may include the metal more than that of the metal-carbon composite catalyst having the metal ions. Among the metal-carbon composite catalysts 140 having the first to fourth configurations, the metal-carbon composite catalyst 120 having the second configuration may have the highest element content of the metal. In general, a metal selected from cobalt or iron may be used as a catalyst for the oxygen reduction reaction and the oxygen evolution reaction. Accordingly, the metal-carbon composite catalyst 120 having the second configuration may have a high activity on the oxygen evolution reaction.

In addition, the metal-carbon composite catalyst may have a larger specific surface area when including the carbon porous body rather than the carbon sheet. In other words, the metal-carbon composite catalyst 140 having the third configuration and the fourth configuration may have a specific surface area larger than that of the metal-carbon composite catalyst 120 having the first configuration and the second configuration.

The metal-carbon composite catalyst prepared in the above-described manner may include a carbon matrix structure, and a metal bonded to the carbon matrix structure. The form of the metal-carbon composite catalyst may vary depending on an existence the organic precursor of the source solution, a kind of the organic precursor, and a type of the metal precursor. Specifically, the carbon matrix structure may have at least one form of the nitrogen-doped carbon sheet, or the nitrogen-doped carbon porous body. The bonding force between the metal and the carbon matrix structure may vary according to the type of nitrogen included in the carbon matrix structure, and accordingly, the metal may have at least one form of the metal ions or the metal particles.

As described above, the metal may be bonded to the nitrogen of the carbon matrix structure. Specifically, for example, when the metal is at least one selected from cobalt or iron, the metal-nitrogen bond may be used as a catalyst for an oxygen reduction reaction. The metal-carbon composite catalyst prepared in the above-described manner may be prepared at a cost lower than that of the conventional platinum-based catalyst used in the oxygen reduction reaction. Accordingly, the metal-carbon composite catalyst may be easily used as a catalyst for the oxygen reduction reaction of a fuel cell or a metal-air battery.

Figure 7:
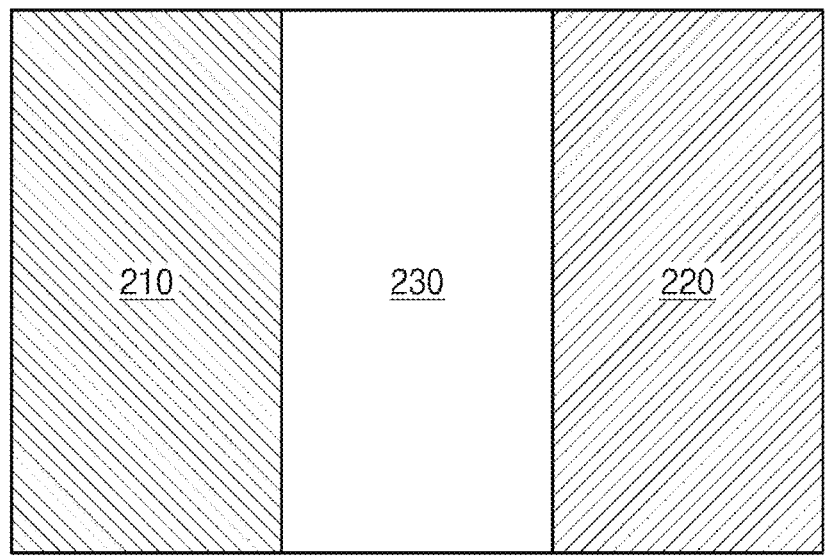
FIG. 7 is a schematic view of a zinc-air battery according to the embodiment of the present invention.

FIG. 7 is a schematic view of a zinc-air battery according to the embodiment of the present invention.

Referring to FIG. 7, the zinc-air battery, which includes a positive electrode 210, a negative electrode 220, and an electrolyte 230 disposed between the positive electrode 210 and the negative electrode 220, may be prepared.

The positive electrode 210 may include a positive electrode current collector, and the metal-carbon composite catalyst according to the above-described embodiment of the present invention. Specifically, the metal-carbon composite catalyst according to the above-described embodiment of the present invention may be mixed with a binder, and then applied on the positive electrode current collector.

For example, the binder may include at least one of vinylidene fluoride, hexafluoropropylene, polyacrylonitrile, polymethylmethacrylate, or polytetrafluoroethylene, and for example, the positive electrode current collector may include at least one of a nickel mesh or a copper mesh.

According to one embodiment, the electrolyte 230 may be an aqueous solution containing at least one alkali of potassium hydroxide and sodium hydroxide.

The zinc-air battery may further include a separator between the positive electrode 210 and the negative electrode 220. Specifically, for example, the separator may be at least any one of polyester, teflon, polyethylene, polypropylene or polytetrafluoroethylene.

As described above, the positive electrode 210 may use the oxygen as the positive electrode active material. Accordingly, the oxygen introduced into the zinc-air battery through a diffusion layer 212 may react with the electrolyte 230 as shown in <Reaction Formula 1> below to form hydroxide ions.

$$O_2+2H_2O+4e^- =>4OH^-$$  <Reaction Formula 1> the catalyst layer 216 may serve to improve the reduction reaction between the oxygen and the electrolyte 230. As described above with reference to FIGS. 1 to 5, the metal-carbon composite catalyst 130 having the third configuration may exhibit the excellent oxygen reduction properties. In addition, the metal-carbon composite catalyst 120 having the second configuration may exhibit the excellent oxygen evolution property. Accordingly, the catalyst layer 216 may be prepared as the metal-carbon composite catalyst having at least one of the second configuration and the third configuration.

As described above, the generated hydroxide ions may react with the zinc metal of the negative electrode 220 as shown in <Reaction Formula 2> below.

$$Zn(OH)+4OH^- ->Zn(OH)_4^{2-}+2e^-$$  <Reaction Formula 2>

As described above, the charge generated by the oxidation-reduction reaction of oxygen may move through an external conductor connecting the negative electrode 220 and the positive electrode current collector 214, and accordingly, the zinc-air battery may be actuated.

Hereinafter, a method for preparing the metal-carbon composite catalyst and a characteristic evaluation result will be described according to specific experimental examples of the present invention.

Preparation of Metal-Carbon Composite Catalyst According to Experimental Example 1-1

First, 50 mL of methylpyrrolidone (NMP) as the monomer, and 200 mM cobalt sulfate ($CoSO_4$) as the metal precursor are provided.

A source material including the methylpyrrolidone and the cobalt sulfate is prepared.

An intermediate product is prepared by heat treating the source material at a temperature of 200° C. for 24 hours in an oxygen atmosphere.

The intermediate product is carbonized at a temperature of 700° C. for 30 minutes under an argon atmosphere, so that a metal-carbon composite catalyst according to Experimental Example 1-1 is prepared.

Preparation of Metal-Carbon Composite Catalyst According to Experimental Example 1-2

It is prepared in the same manner as the above-described metal-carbon composite catalyst according to Experimental Example 1-1, except that 1.2 M of 4-aminopyridine (4-AP) is further added to the source material, and the step of carbonizing the intermediate product is carried out at a temperature of 900° C. instead of 700° C. Accordingly, a metal-carbon composite catalyst according to Experimental Example 1-2 is prepared.

Preparation of Metal-Carbon Composite Catalyst According to Experimental Example 1-3

It is prepared in the same manner as the above-described metal-carbon composite catalyst according to Experimental Example 1-1, except that 1.2 M of pyrrole-2-carboxylic acid (PCA) is further added to the source material. Accordingly, a metal-carbon composite catalyst according to Experimental Example 1-3 is prepared.

Preparation of Metal-Carbon Composite Catalyst According to Experimental Example 1-4

It is prepared in the same manner as the above-described metal-carbon composite catalyst according to Experimental Example 1-3, except that 50 mM of cobalt cyanide (Co(CN)2) is used instead of the cobalt sulfate as the metal precursor. Accordingly, a metal-carbon composite catalyst according to Experimental Example 1-4 is prepared.

As a comparison group for the metal-carbon composite catalysts according to the above-described Experimental Examples 1-1 to 1-4, a catalyst for a typical zinc-air battery is provided. Accordingly, materials of the metal-carbon composite catalysts according to the above-described Experimental Examples 1-1 to 1-4 and Comparative Examples 1-1 to 1-2 are shown in Table 1 below.

TABLE 1

|  | Materials | Monomer | Organic additive | Metal precursor |
|---|---|---|---|---|
| Comparative Example 1-1 | Pt/C | — | — | — |
| Comparative Example 1-2 | RuO2 | — | — | — |
| Experimental Example 1-1 | — | NMP | — | $CoSO_4$ |
| Experimental Example 1-2 | — | NMP | 4-AP | $CoSO_4$ |
| Experimental Example 1-3 | — | NMP | PCA | $CoSO_4$ |
| Experimental Example 1-4 | — | NMP | PCA | $Co(CN)_2$ |

Figure 8:
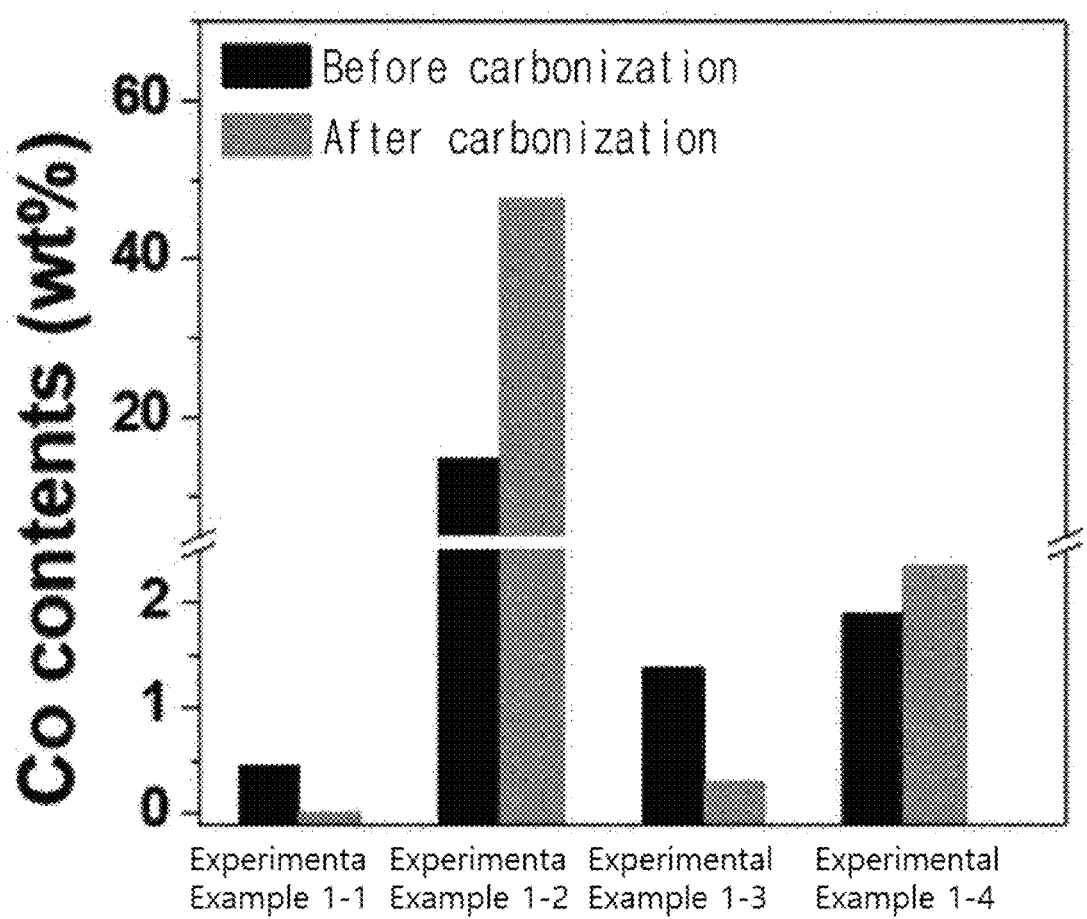
FIG. 8 is a view showing the amount of cobalt element before and after a carbonizing step of the metal-carbon composite catalyst according to the embodiment of the present invention.

FIG. 8 is a view showing the amount of cobalt element before and after a carbonizing step of the metal-carbon composite catalyst according to the embodiment of the present invention.

Referring to FIG. 8, the metal-carbon composite catalysts according to Experimental Examples 1-1 to 1-4 of the present invention are prepared through the carbonizing step as described above with reference to FIGS. 1 to 5.

As shown in FIG. 8, it can be seen that the metal-carbon composite catalysts according to Experimental Example 1-2 and Experimental Example 1-4 have the increased mass ratios of cobalt element, compared to before the carbonizing step. Whereas, it can be seen that the metal-carbon composite catalysts according to Experimental Example 1-1 and Experimental Example 1-3 have the decreased mass ratios of the cobalt element, compared to before the carbonizing step.

Accordingly, as described above with reference to FIGS. 1 to 5, it can be seen that the metal-carbon composite catalysts according to Experimental Example 1-1 and Experimental Example 1-3 is prepared after cobalt having a weak binding force with nitrogen is removed together with the organic substances of the polymer in the carbonizing step.

Whereas, it can be seen that the metal-carbon composite catalysts according to Experimental Example 1-2 and Experimental Example 1-4 have the increased mass ratios of the cobalt to the total weight, since the cobalt is not substantially removed but the organic substance is removed in the carbonizing step, due to the strong bonding force between the nitrogen and the cobalt.

FIGS. 9 to 12 are views showing a transmission electron microscope (TEM) image of the metal-carbon composite catalyst according to the embodiment of the present invention, and a distribution of cobalt element.

Referring to FIGS. 9 to 12, transmission electron microscope images of the metal-carbon composite catalysts according to Experimental Examples 1-1 to 1-4 of the present invention, distributions of the cobalt element, and high-resolution transmission electron microscope images are confirmed.

Figure 9:
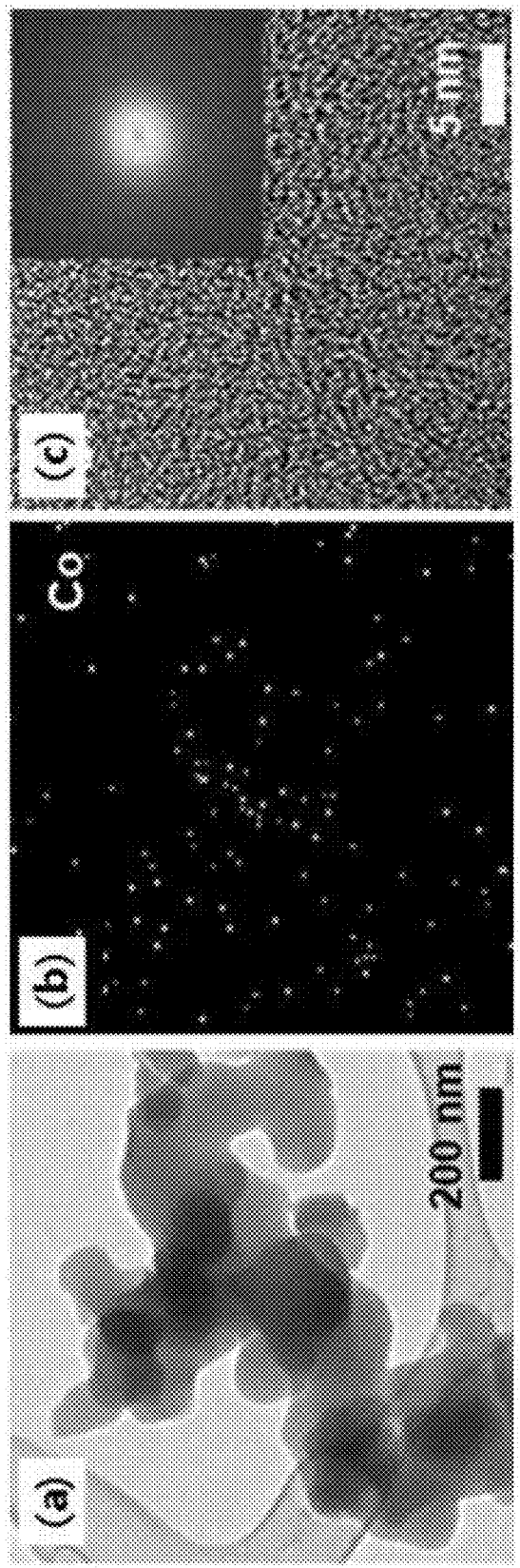
FIGS. 9 to 12 are views showing a transmission electron microscope (TEM) image of the metal-carbon composite catalyst according to the embodiment of the present invention, and a distribution of cobalt element.
Figure 10:
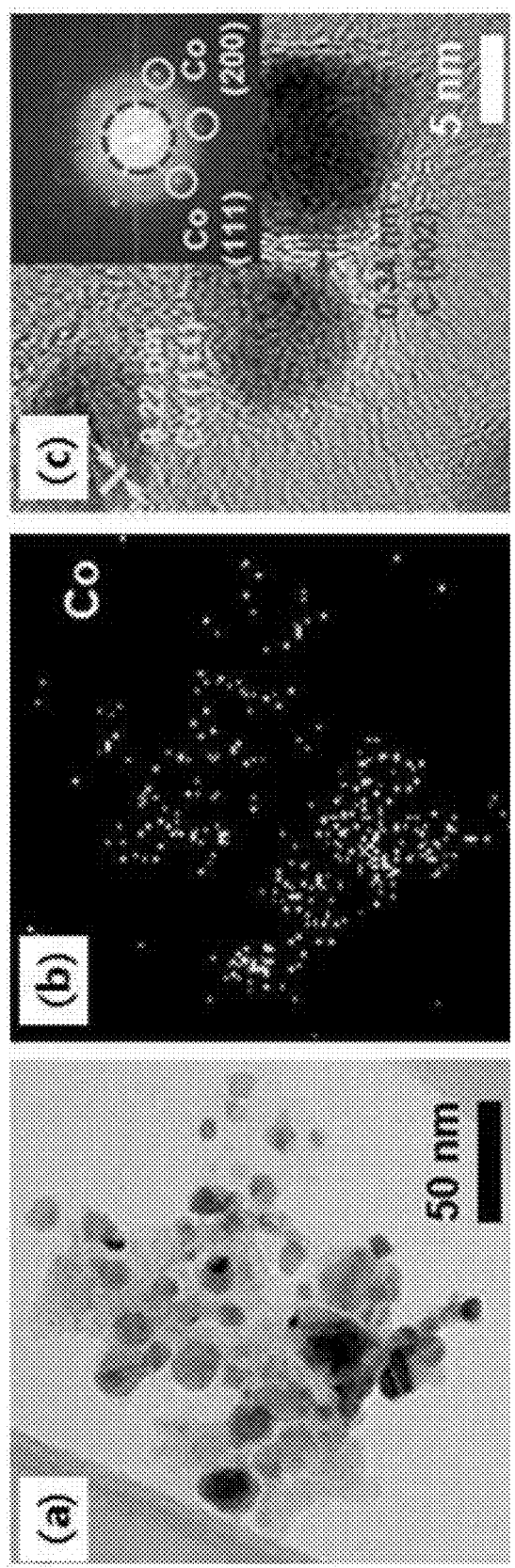
Figure 11:
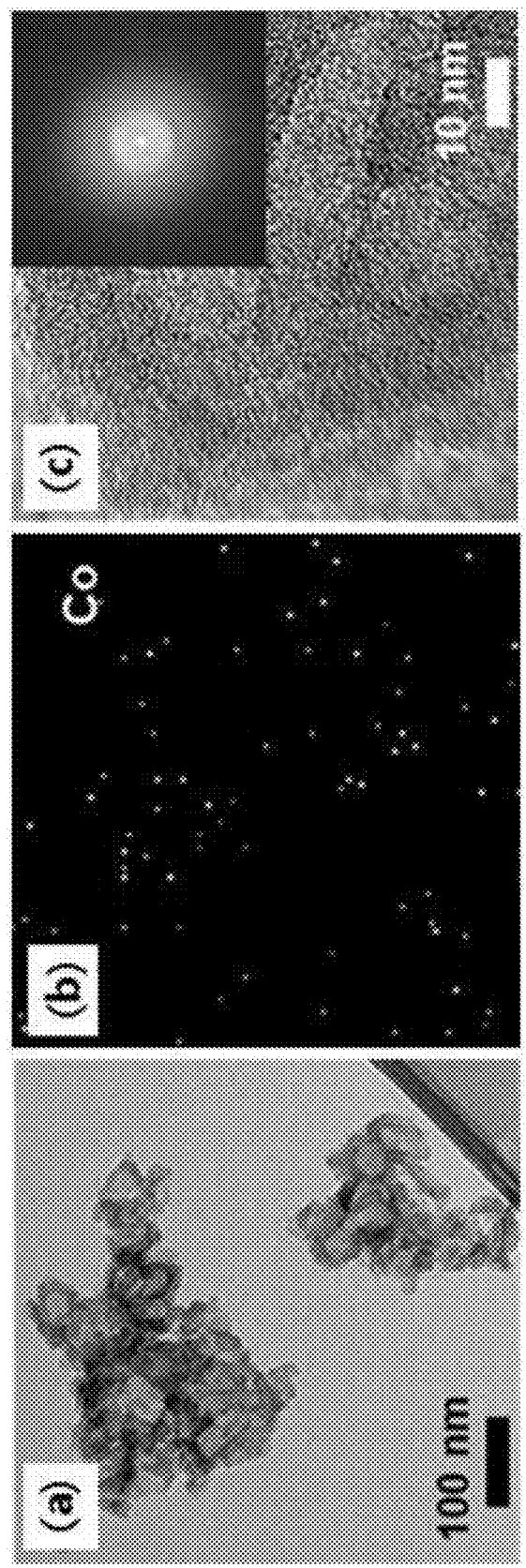

Referring to FIGS. 9 and 11, the metal-carbon composite catalysts according to Experimental Example 1-1 and Experimental Example 1-3 are prepared to include the metal ions as the metal. As described above with reference to FIGS. 1 to 5, it can be seen that the metal-carbon composite catalysts according to Experimental Example 1-1 and Experimental Example 1-3 have the cobalt element distributed more widely compared to the metal-carbon composite catalysts according to Experimental Example 1-2 and Experimental Example 1-4 shown in FIGS. 10 and 12. In addition, it can be seen that the cobalt element does not have a crystal structure.

Whereas, as described above, it can be seen that, in the metal-carbon composite catalysts according to Experimental Example 1-2 and Experimental Example 1-4, the cobalt element has a crystal structure. Accordingly, it can be seen that the metal-carbon composite catalysts according to Experimental Example 1-2 and Experimental Example 1-4 have the metal particles as the metal.

Figure 12:
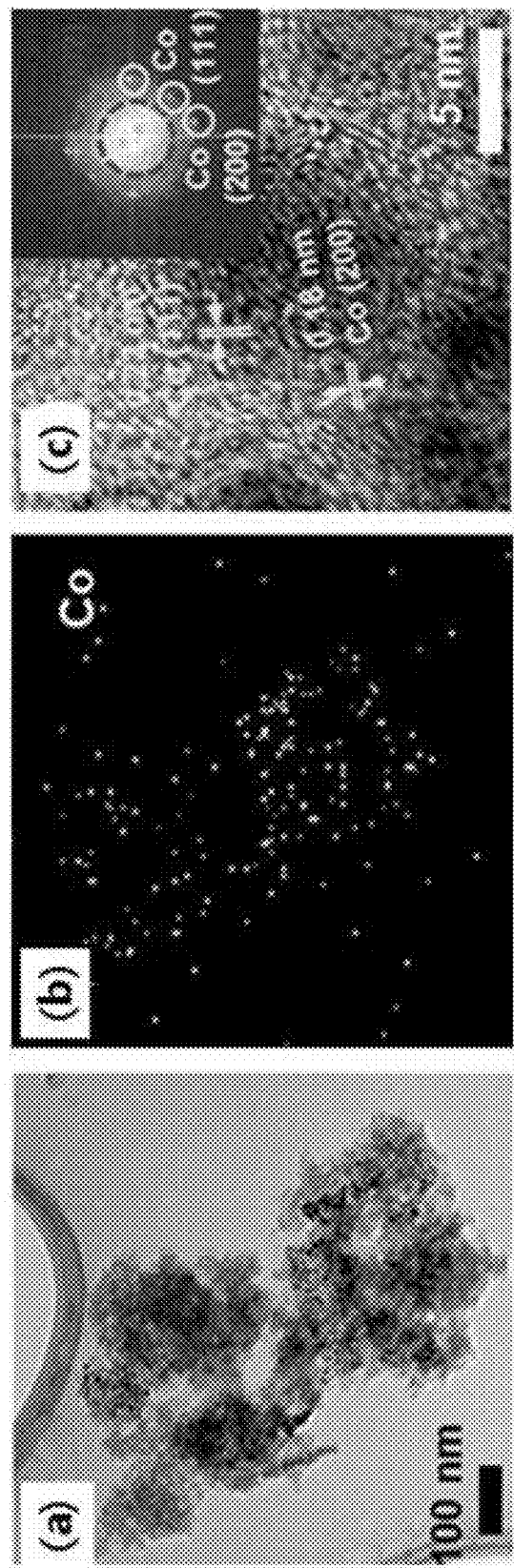

In addition, as shown in FIG. 10(*c*) and FIG. 12(*c*), an interplanar distance of 0.34 nm on surfaces of the cobalt particles, that is, an interplanar distance corresponding to plane 002 of carbon elements is measured. Accordingly, it can be seen that the metal-carbon composite catalysts according to Experimental Example 1-2 and Experimental Example 1-4 include carbon shells on the surfaces of the cobalt particles.

Figure 13:
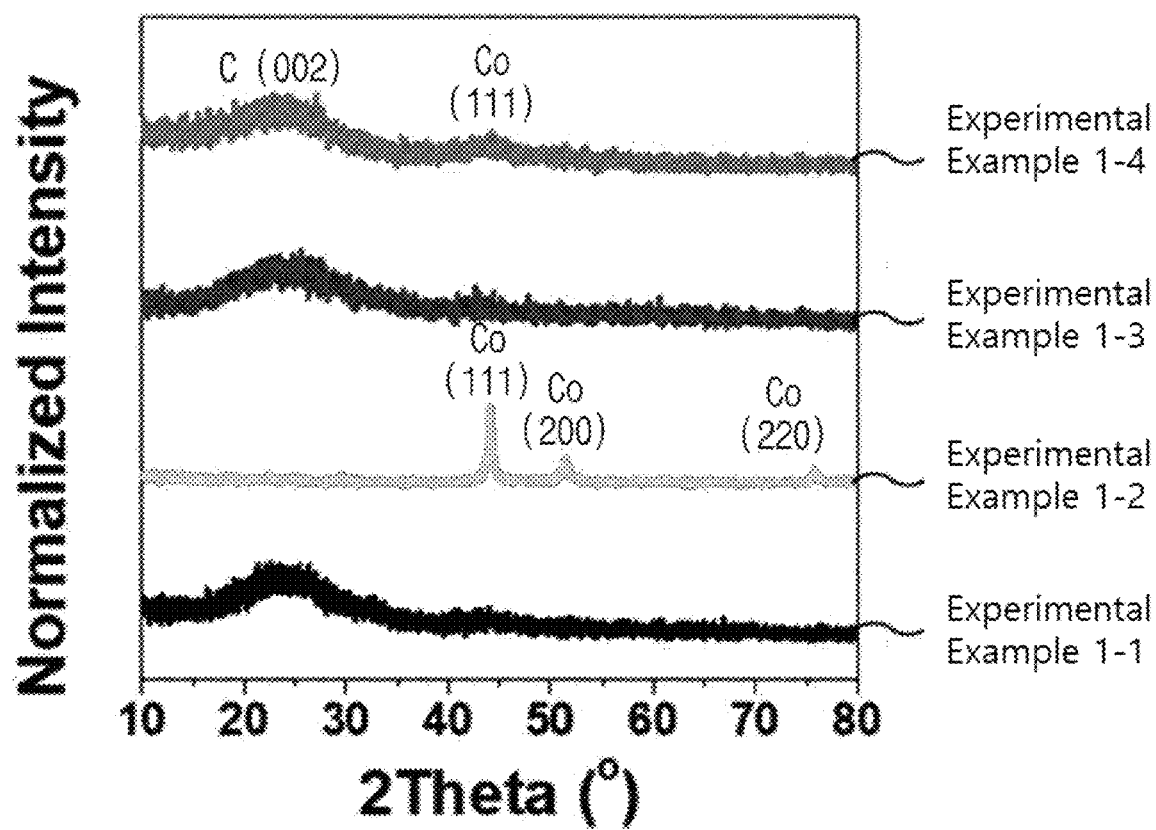
FIG. 13 is a view showing an X-ray diffraction pattern (XRD) of the metal-carbon composite catalyst according to the embodiment of the present invention.

FIG. 13 is a view showing an X-ray diffraction pattern (XRD) of the metal-carbon composite catalyst according to the embodiment of the present invention.

Referring to FIG. 13, it can be seen that the metal-carbon composite catalysts according to Experimental Examples 1-1 to 1-4 of the present invention have peaks at 24°, 44°, 52°, and 76°. Accordingly, it can be seen that the metal-carbon composite catalysts have cobalt elements.

As described above with reference to FIGS. 1 to 5, it can be seen that the metal-carbon composite catalysts according to Experimental Example 1-2 and Experimental Example 1-4 have relatively high peak values representing the cobalt element, whereas the metal-carbon composite catalysts according to Experimental Example 1-1 and Experimental Example 1-3 have relatively low peak values representing the cobalt element.

Figure 14:
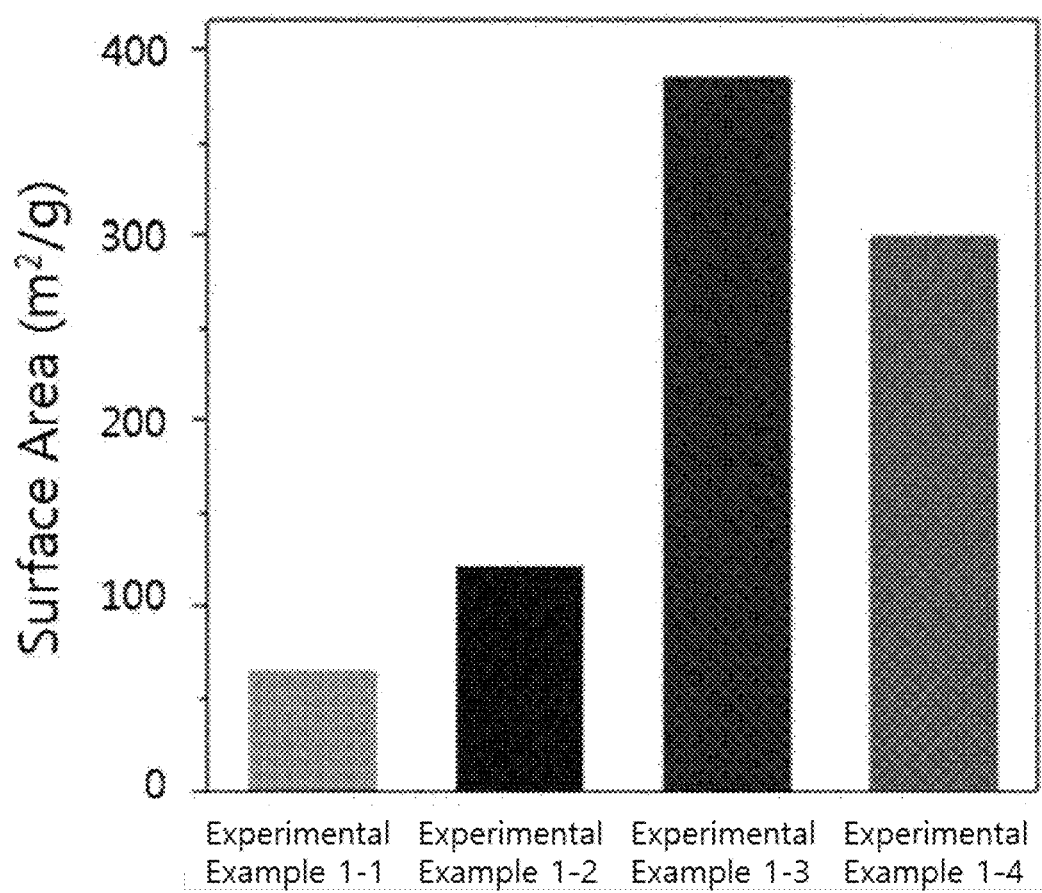
FIG. 14 is a view showing the surface area of the metal-carbon composite catalyst according to the embodiment of the present invention.

FIG. 14 is a view showing the surface area of the metal-carbon composite catalyst according to the embodiment of the present invention.

Referring to FIG. 14, as described above with reference to FIGS. 1 to 5, it can be seen that the metal-carbon composite catalysts according to Experimental Example 1-3 and Experimental Example 1-4, which include the carbon porous body, have the larger surface area than the metal-carbon composite catalysts, which include the carbon sheet, according to Experimental Example 1-1 and Experimental Example 1-2.

In addition, it is confirmed that, among the metal-carbon composite catalysts including the carbon porous body, the metal-carbon composite catalyst according to Experimental Example 1-3, which includes the metal ions, has the surface area larger than that of the metal-carbon composite catalyst according to Experimental Examples 1-4, which includes the metal particles.

Figure 15:
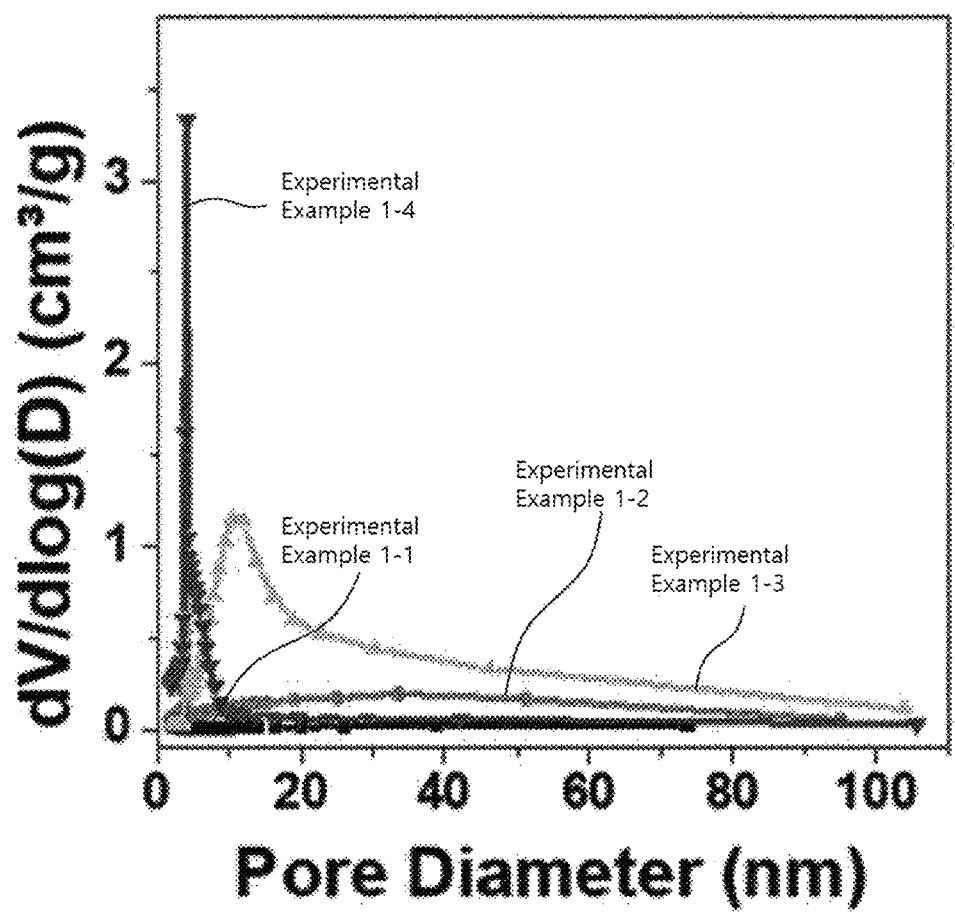
FIG. 15 is a view showing a distribution of pores of the metal-carbon composite catalyst according to the embodiment of the present invention.
Figure 16:
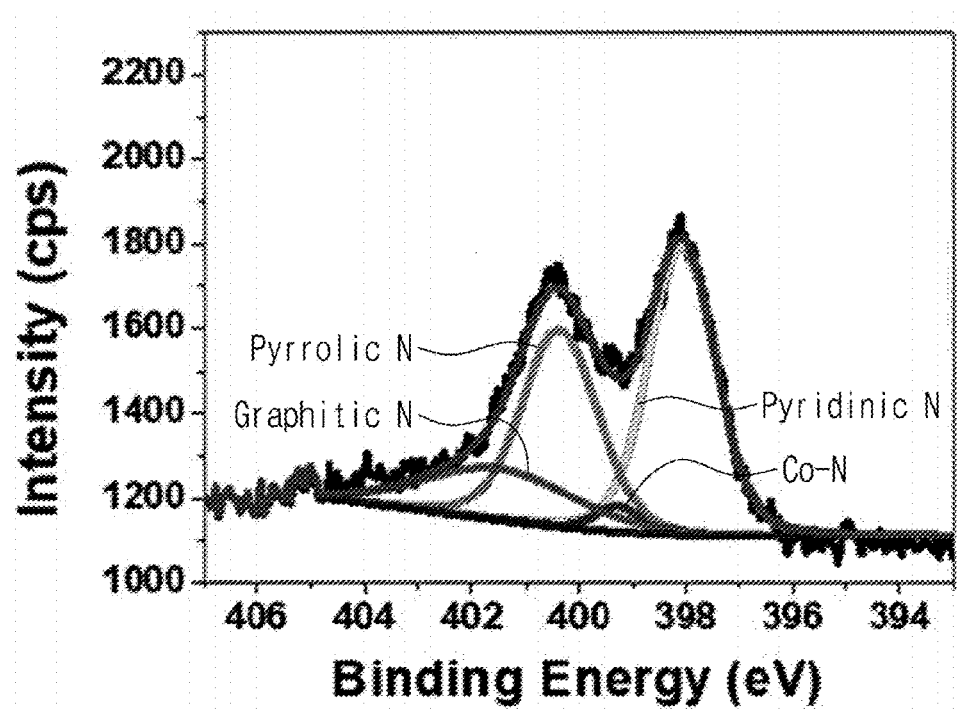
FIGS. 16 to 19 are views showing results of nitrogen is X-ray photoelectron spectroscopy (XPS) of the metal-carbon composite catalyst according to the embodiment of the present invention.
Figure 17:
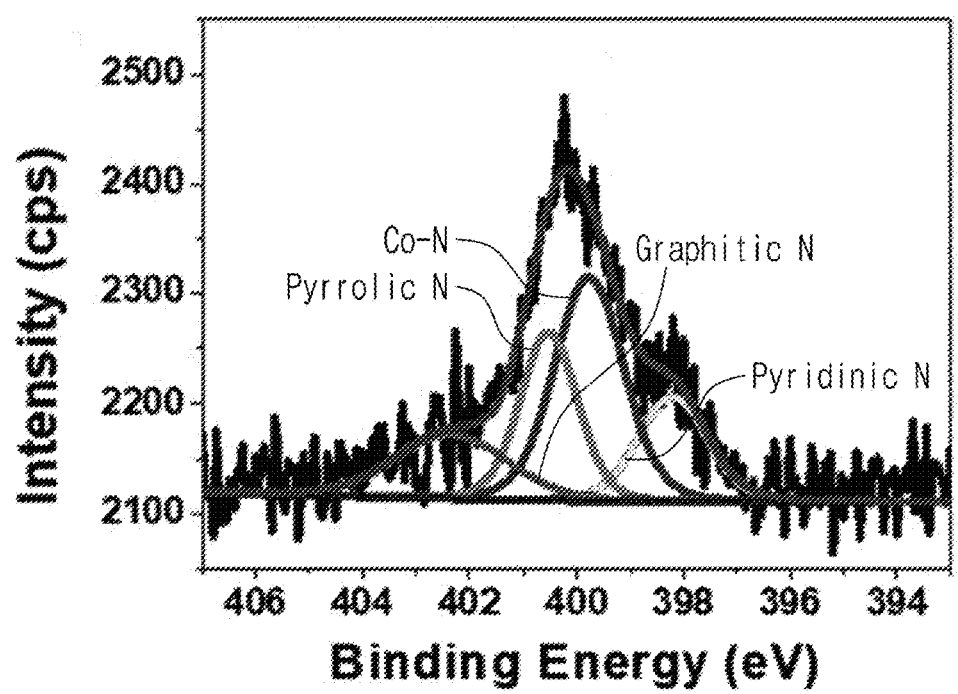
Figure 18:
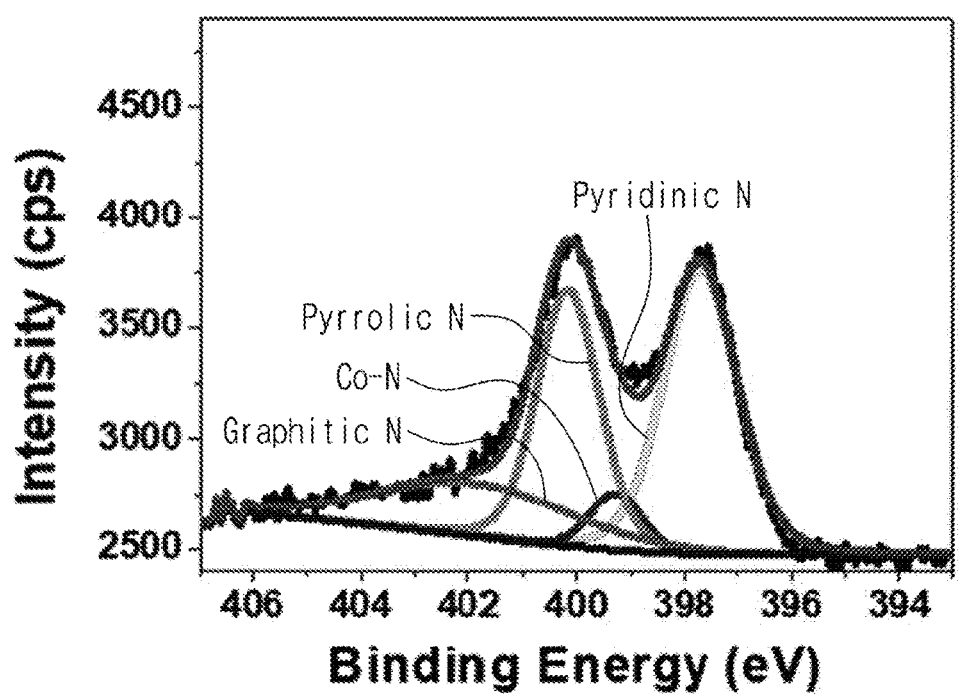
Figure 19:
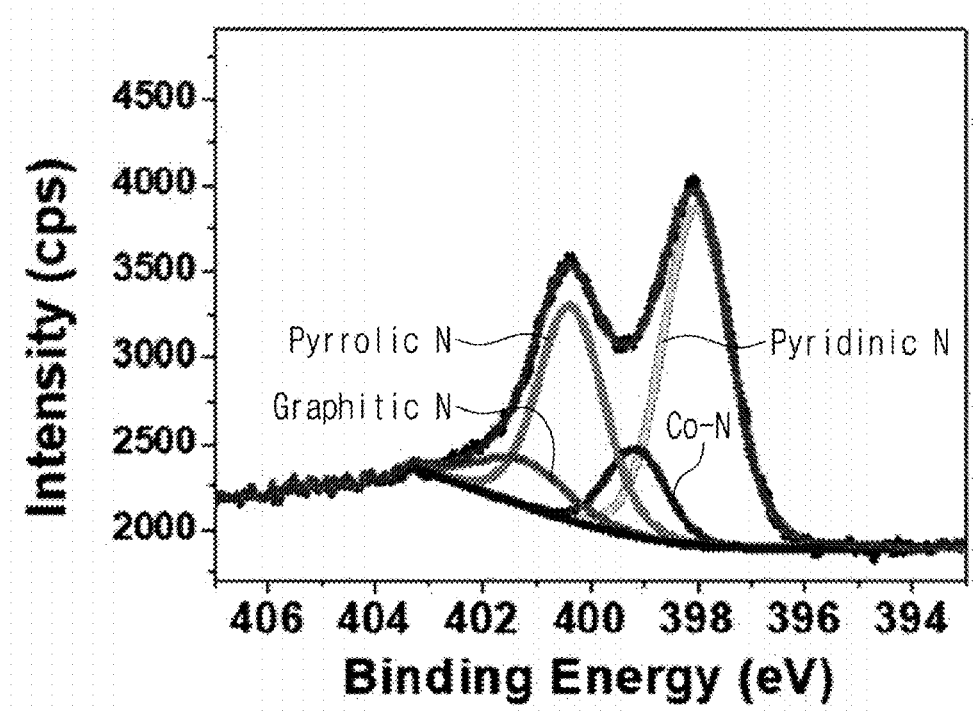

FIG. 15 is a view showing a distribution of pores of the metal-carbon composite catalyst according to the embodiment of the present invention.

Referring to FIG. 15, the distribution of pores in the metal-carbon composite catalysts according to Experimental Examples 1-1 to 1-4 of the present invention is confirmed.

As shown in FIG. 15, it can be seen that, compared to the metal-carbon composite catalyst including the carbon sheet (that is, Experimental Examples 1-1 and 1-2), the metal-carbon composite catalyst including the carbon porous body (that is, Experimental Examples 1-3 and 1-4) has more pores.

In addition, it can be seen that the metal-carbon composite catalyst according to Experimental Examples 1-4 has a smaller pore size but has more dense size distribution of the pores, compared to the metal-carbon composite catalyst according to Experimental Example 1-3.

Figure 20:
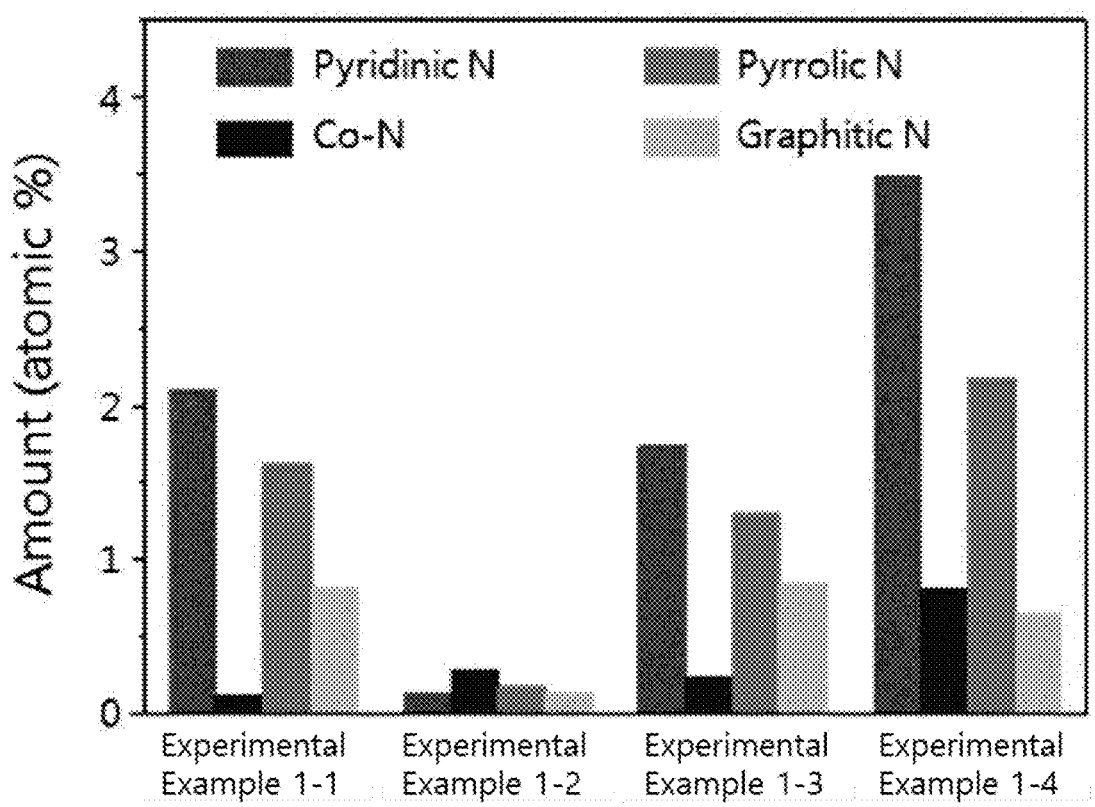
FIG. 20 is a graph showing the composition ratio (atomic percent) of nitrogen atoms of the metal-carbon composite catalyst according to the embodiment of the present invention.
Figure 21:
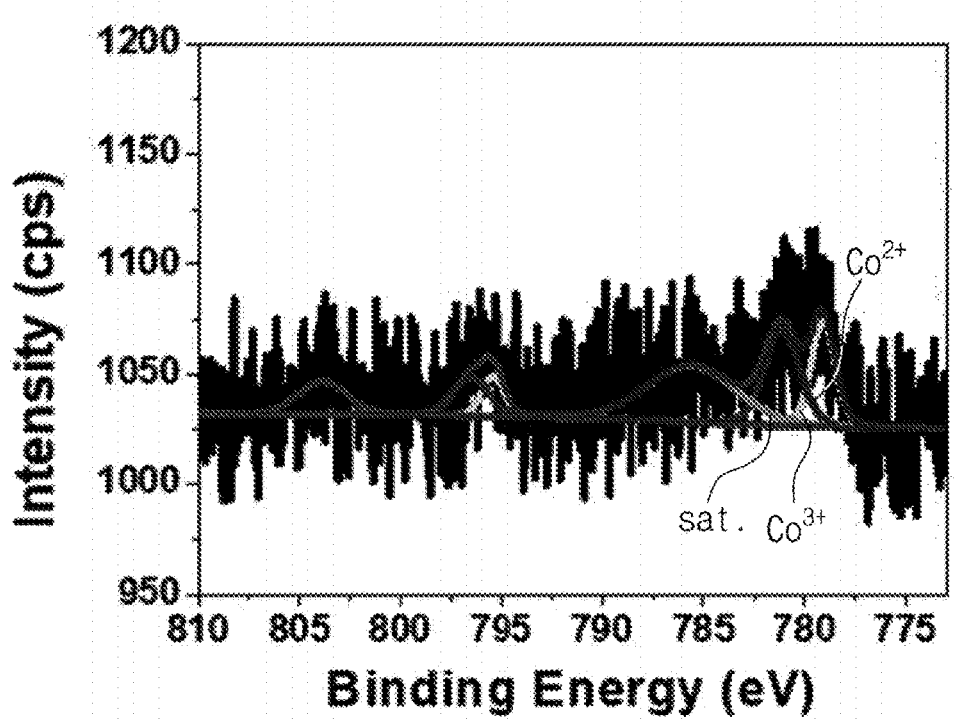
FIGS. 21 to 24 are views showing results of cobalt 2s X-ray photoelectron spectroscopy (XPS) of the metal-carbon composite catalyst according to the embodiment of the present invention.
Figure 22:
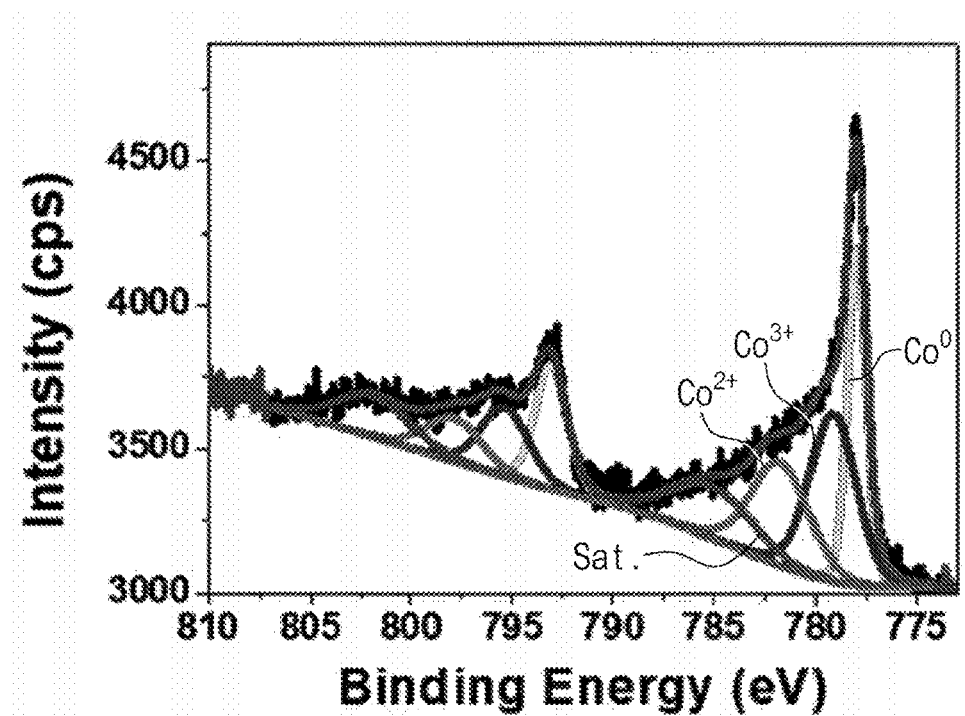
Figure 23:
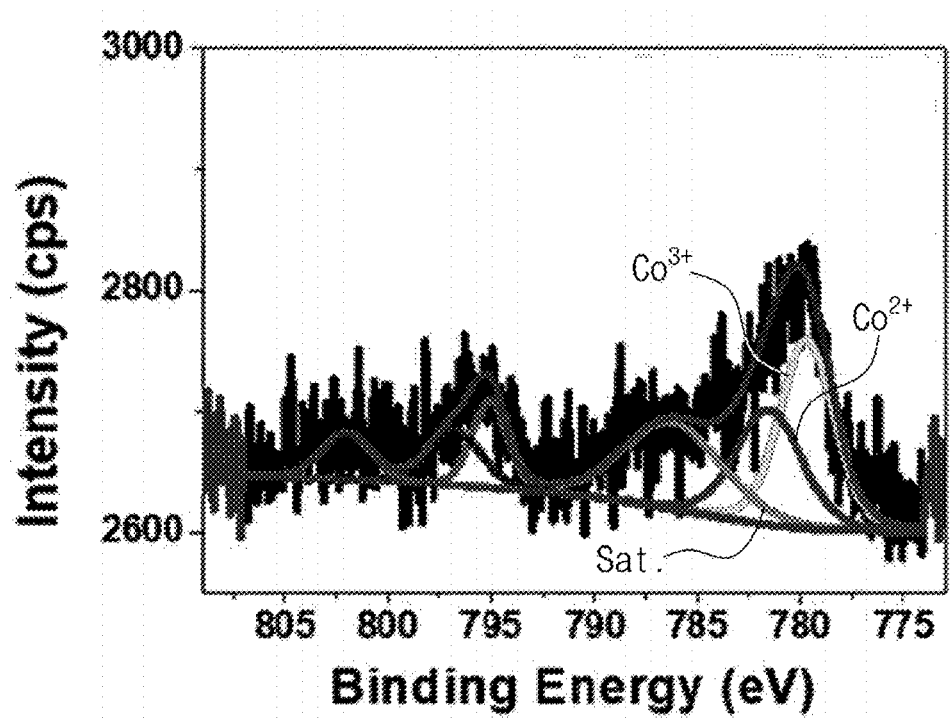
Figure 24:
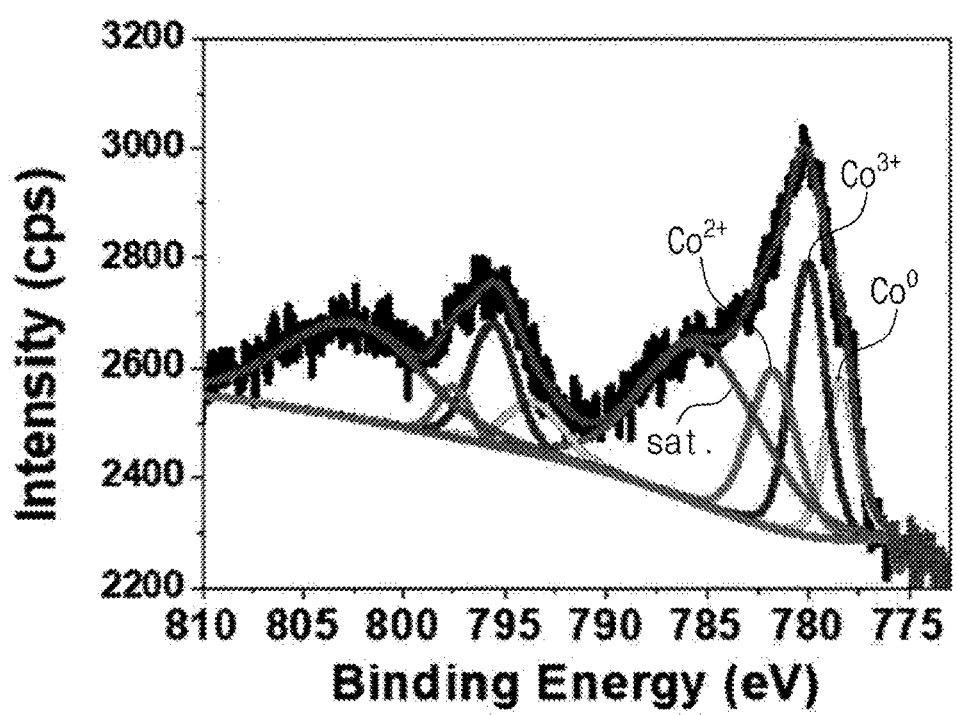

FIGS. 16 to 19 are views showing results of nitrogen 1s X-ray photoelectron spectroscopy (XPS) of the metal-carbon composite catalyst according to the embodiment of the present invention. FIG. 20 is a graph showing the composition ratio (atomic percent) of nitrogen atoms of the metal-carbon composite catalyst according to the embodiment of the present invention.

Referring to FIGS. 16 to 19, the type and amount of nitrogen contained in the metal-carbon composite catalyst according to the embodiment of the present invention are shown. As described above with reference to FIGS. 1 to 5, the metal-carbon composite catalyst may include the pyridinic nitrogen, the pyrrolic nitrogen, the graphitic nitrogen, and the cobalt-nitrogen bond. The pyridinic nitrogen may have binding energy of about 398 eV, the pyrrolic nitrogen of about 400 eV, the graphitic nitrogen of about 402 eV, and the cobalt-nitrogen of about 399 eV. Accordingly, the binding energies to the nitrogen is element of the metal-carbon composite catalysts according to Experimental Examples 1-1 to 1-4 are measured, so that the distribution of the nitrogen is checked.

Referring to FIG. 20, the atomic composition ratios of the nitrogen distributed in the metal-carbon composite catalysts according to Experimental Examples 1-1 to 1-4 shown in FIGS. 16 to 19 are arranged.

As described above with reference to FIGS. 1 to 5, it can be seen that the metal-carbon composite catalyst including the carbon sheet (that is, Experimental Examples 1-1 and 1-2) includes the pyrrolic nitrogen more than the graphitic nitrogen. It can be seen that the metal-carbon composite catalyst including the carbon porous body (that is, Experimental Examples 1-3 and 1-4) includes the pyridinic nitrogen more than the pyrrolic nitrogen, and includes the pyrrolic nitrogen more than the graphitic nitrogen.

In addition, it can be seen that the metal-carbon composite catalyst including the metal particles (that is, Experimental Examples 1-2 and 1-4) includes the cobalt-nitrogen more than the metal-carbon composite catalyst including the metal ions (that is, Experimental Examples 1-1 and 1-3).

Figure 25:
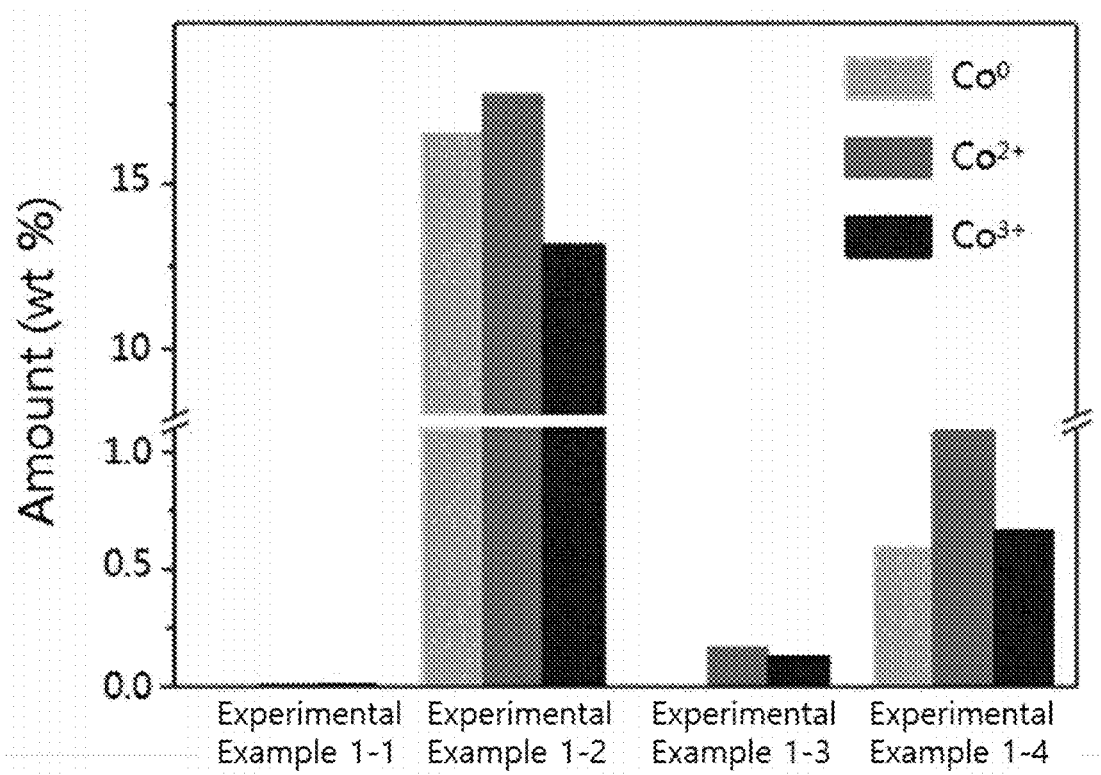
FIG. 25 is a graph showing the composition ratio (atomic percent) of cobalt atoms of the metal-carbon composite catalyst according to the embodiment of the present invention.

FIGS. 21 to 24 are views showing results of cobalt 2s X-ray photoelectron spectroscopy (XPS) of the metal-carbon composite catalyst according to the embodiment of the present invention. FIG. 25 is a graph showing the composition ratio (atomic percent) of cobalt atoms of the metal-carbon composite catalyst according to the embodiment of the present invention.

Referring to FIGS. 21 to 24, the distribution and amount of the cobalt 2p element in the metal-carbon composite catalysts according to Experimental Examples 1-1 to 1-4 of the present invention are shown. The cobalt 2p element may have two peaks: cobalt 2p1/2 and cobalt 2p3/2. Accordingly, FIG. 25 shows the atomic distributions of the cobalt element and cobalt ions according to the intensity of the peak of the cobalt 2p element shown in FIGS. 21 to 24.

Referring to FIG. 25, as described above with reference to FIGS. 1 to 5, it can be seen that the metal-carbon composite catalysts according to Experimental Examples 1-1 and 1-3 include the cobalt ions only.

In addition, it can be seen that the metal-carbon composite catalyst including the metal particles (that is, Experimental Examples 1-2 and 1-4) includes more metals, compared to the metal-carbon composite catalyst including the metal ions (that is, Experimental Example 1-1 and Experimental Example 1-3).

Figure 26:
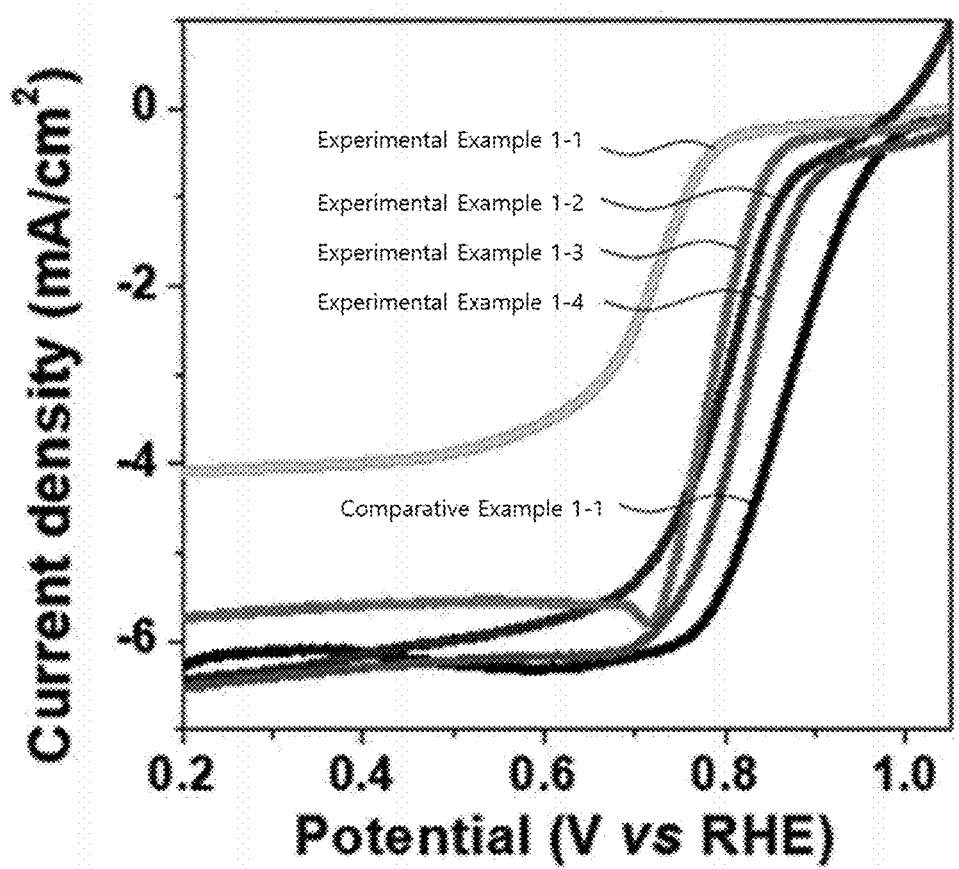
FIG. 26 is a view showing a polarization curve for an oxygen reduction reaction (ORR) of the metal-carbon composite catalyst according to the embodiment of the present invention.

FIG. 26 is a view showing a polarization curve for an oxygen reduction reaction (ORR) of the metal-carbon composite catalyst according to the embodiment of the present invention.

referring to FIG. 26, the current densities subject to potentials of the metal-carbon composite catalysts according to Comparative Example 1-1 and Experimental Examples 1-1 to 1-4 of the present invention are confirmed.

As shown in FIG. 26, it is confirmed that the metal-carbon composite catalyst according to Experimental Example 1-1 has the lowest limit current density, and it can be seen that Comparative Example 1-1, and Experimental Examples 1-2 to 1-4 have a value of about 6 mA/cm2.

In addition, it can be seen that the onset potential also shows a tendency substantially similar to the limiting current density. Specifically, it is confirmed that the metal-carbon composite catalyst according to Experimental Example 1-1 exhibits the lowest value, and it can be seen that Comparative Example 1-1 and Experimental Examples 1-2 to 1-4 have a value between about 7.0 V and about 7.5 V.

Figure 27:
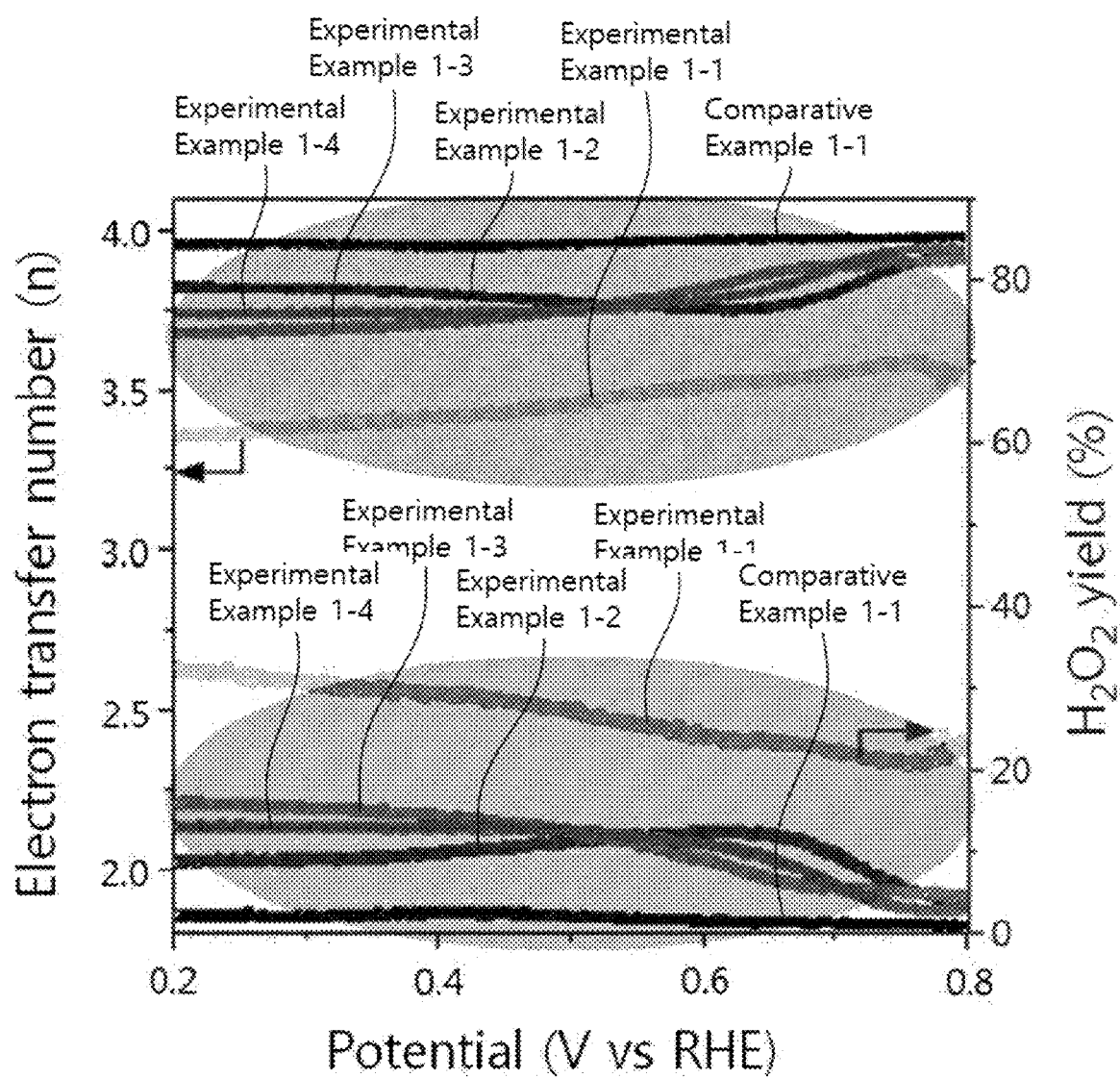
FIG. 27 is a view showing the electron transfer number and the generated amount of hydrogen peroxide for the oxygen reduction reaction of the metal-carbon composite catalyst according to the embodiment of the present invention.

FIG. 27 is a view showing the electron transfer number and the generated amount of hydrogen peroxide for the oxygen reduction reaction of the metal-carbon composite catalyst according to the embodiment of the present invention.

Referring to FIG. 27, as described above with reference to FIG. 7, the metal-carbon composite catalyst may serve to promote the generating reaction of hydroxide ions shown in <Reaction Formula 1>.

Specifically, the generating reaction of hydroxide ions may include a side reaction such as the following <Reaction Formula 3>.

$$O_2 + 2H_2O + 2e^- \rightarrow 2H_2O_2 \qquad \text{<Reaction Formula 3>}$$

In other words, in contrast to the use of 4 electrons in the generating reaction of hydroxide ions shown in <Reaction Formula 1> above, the side reaction is a reaction in which the oxygen receives two electrons to produce the hydrogen peroxide.

After the side reaction is performed, and when many surrounding electrons are present, the hydroxide ions may receive the surrounding electrons to perform the generating reaction of hydroxide ions shown in <Reaction Formula 1>. In other words, the <Reaction Formula 1> above may further include the hydrogen peroxide as an intermediate.

As shown in FIG. 27, it can be seen that the metal-carbon composite catalyst according to Experimental Example 1-1 has the lowest electron transfer number. Accordingly, it can be seen that the side reaction according to <Reaction Formula 3> is performed significantly more, compared to the metal-carbon composite catalysts according to Experimental Examples 1-2 to 1-4.

Whereas, it can be seen that the metal-carbon composite catalysts according to Experimental Examples 1-2 to 1-4 have the electron transfer numbers higher than that of the metal-carbon composite catalyst according to Experimental Example 1-1. Accordingly, it can be seen that the generated amount of hydrogen peroxide is lower than that of the metal-carbon composite catalyst according to Experimental Example 1-1.

Figure 28:
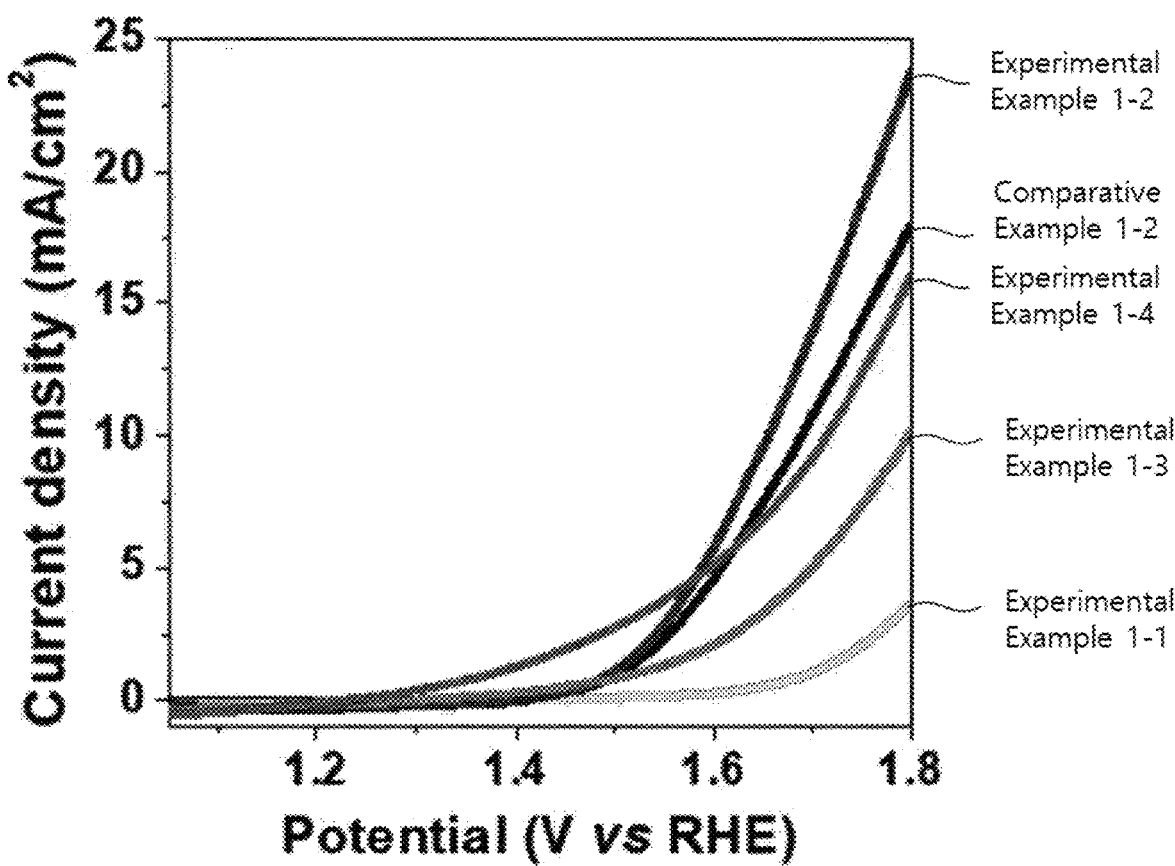
FIG. 28 is a view showing a polarization curve for an oxygen evolution reaction (OER) of the metal-carbon composite catalyst according to the embodiment of the present invention.

FIG. 28 is a view showing a polarization curve for an oxygen evolution reaction (OER) of the metal-carbon composite catalyst according to the embodiment of the present invention.

Referring to FIG. 28, the current densities subject to potentials of the metal-carbon composite catalysts according to Comparative Example 1-2, and Experimental Examples 1-1 to 1-4 of the present invention are confirmed.

As shown in FIG. 28, it can be seen that the metal-carbon composite catalyst according to Experimental Example 1-2 of the present invention has a high current density value to a potential.

Figure 29:
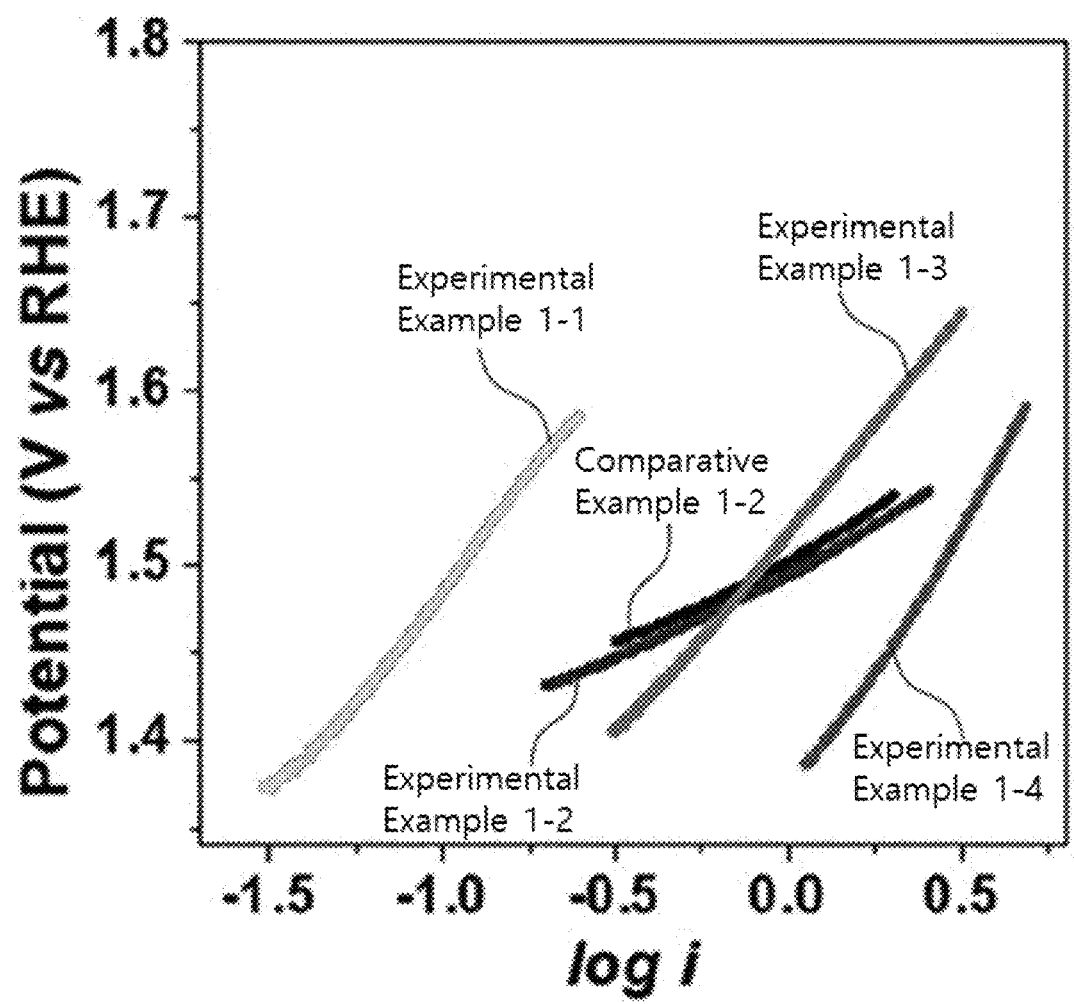
FIG. 29 is a view showing a Tafel slope for the oxygen evolution reaction (OER) of the metal-carbon composite catalyst according to the embodiment of the present invention.

FIG. 29 is a view showing a Tafel slope for the oxygen evolution reaction (OER) of the metal-carbon composite catalyst according to the embodiment of the present invention.

Referring to FIG. 29, Table 2 below shows Tafel slopes for the oxygen evolution reactions of the metal-carbon composite catalysts according to Comparative Example 1-2, and Experimental Examples 1-1 to 1-4 of the present invention.

TABLE 2

|  | Slope(mV/dec) |
| --- | --- |
| Comparative Example 1-2 | 104 |
| Experimental Example 1-1 | 251 |
| Experimental Example 1-2 | 101 |
| Experimental Example 1-3 | 243 |
| Experimental Example 1-4 | 326 |

In general, the Tafel slope may indicate a high activity of the oxygen evolution reaction as a value of the slope is decreased.

As shown in Table 2, it can be seen that the metal-carbon composite catalyst according to Experimental Example 1-2 of the present invention has a slope lower than those of the metal-carbon composite catalysts according to Comparative Example 1-2, Experimental Examples 1-1, 1-3 and 1-4. In other words, it can be seen that the metal-carbon composite catalyst according to Experimental Example 1-2 has the highest activity of the oxygen evolution reaction.

Figure 30:
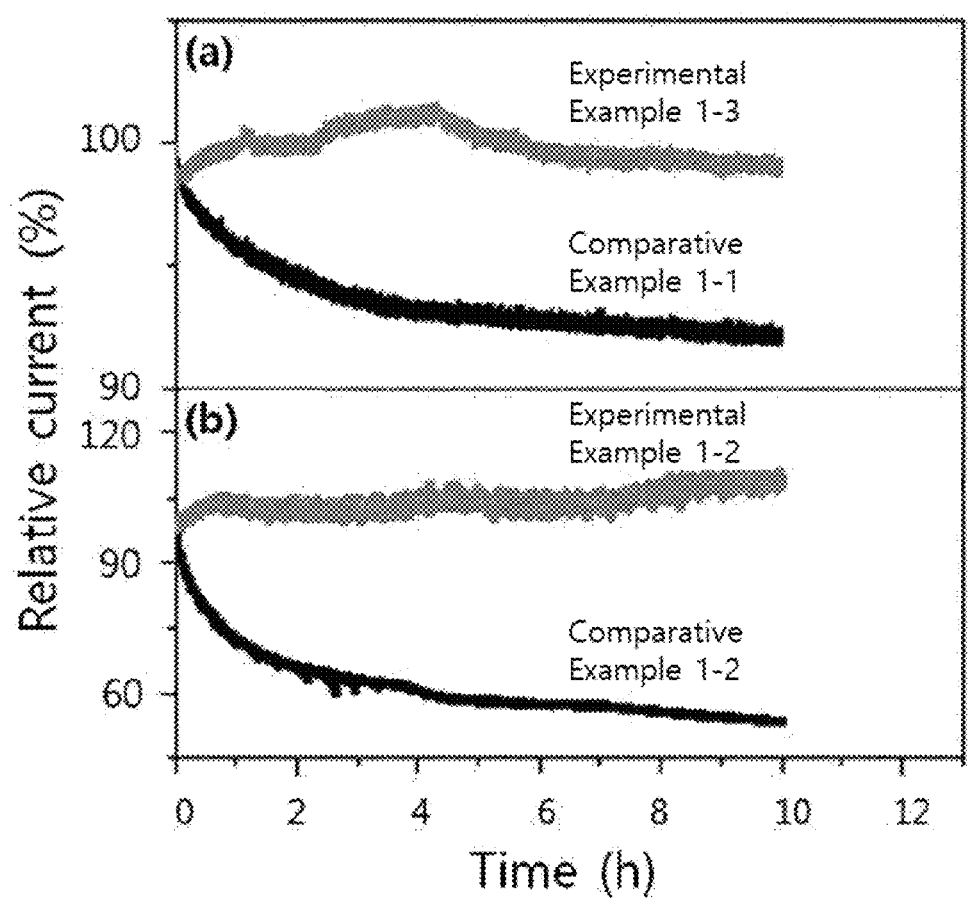
FIG. 30 is a view showing results of the chronoamperometric response to the oxygen reduction reaction and the oxygen evolution reaction of the metal-carbon composite catalyst according to the embodiment of the present invention.

FIG. 30 is a view showing results of the chronoamperometric response to the oxygen reduction reaction and the oxygen evolution reaction of the metal-carbon composite catalyst according to the embodiment of the present invention.

Referring to FIG. 30(a), as described above with reference to FIG. 27, the oxygen reduction reaction is carried out using the metal-carbon composite catalyst according to Experimental Example 1-3 exhibiting the highest activity of the oxygen reduction reaction among metal-carbon composite catalysts according to Experimental Examples 1-1 to 1-4, with respect to the potential of 0.6V compared to a reversible hydrogen reduction electrode (RHE).

TABLE 3

| ORR | (%) |
|---|---|
| Comparative Example 1-1 | 92.2 |
| Experimental Example 1-3 | 99.1 |

Referring to FIG. 27, it can be seen that the metal-carbon composite catalyst according to Experimental Example 1-3 exhibits a low activity of the oxygen reduction reaction, compared to the metal-carbon composite catalyst according to Comparative Example 1-1. Whereas, referring to FIG. 30(a) and Table 3, it is confirmed that the metal-carbon composite catalyst according to Comparative Example 1-1 has a current strength decreased according to time, compared to the metal-carbon composite catalyst according to Experimental Example 1-3. In other words, it can be seen that the metal-carbon composite catalyst according to Experimental Example 1-3 has a long lifespan.

Referring to FIG. 30(b), as described above with reference to Table 2, the oxygen evolution reaction is performed using the metal-carbon composite catalyst according to Experimental Example 1-2 having the lowest Tafel slope.

TABLE 4

| OER | (%) |
|---|---|
| Comparative Example 1-2 | 53.6 |
| Experimental Example 1-2 | 108.7 |

As shown in FIG. 30(b) and Table 4, it can be seen that the metal-carbon composite catalyst according to Experimental Example 1-2 has a constant current according to time compared to the metal-carbon composite catalyst according to Comparative Example 1-2. In other words, as described above, it can be seen that the metal-carbon composite catalyst according to Experimental Example 1-2 has a long lifespan.

As described above with reference to FIGS. 29 and 30, it can be seen that the metal-carbon composite catalyst according to Experimental Example 1-2 has the highest activity of the oxygen evolution reaction. In addition, it is confirmed that the metal-carbon composite catalyst according to Experimental Example 1-3 has a long lifespan to have a high stability. Accordingly, the metal-carbon composite catalyst according to Experimental Example 1-2, and the metal-carbon composite catalyst according to Experimental Example 1-3 are mixed in the mass ratio of 1:1, so that the metal-carbon composite catalyst mixture according to Experimental Example 3 is prepared.

In addition, the metal-carbon composite catalyst according to Comparative Example 1-1, and the metal-carbon composite catalyst according to Comparative Example 1-2 are mixed in the mass ratio of 1:1, so that the metal-carbon composite catalyst mixture according to Comparative Example 3 is prepared.

Figure 31:
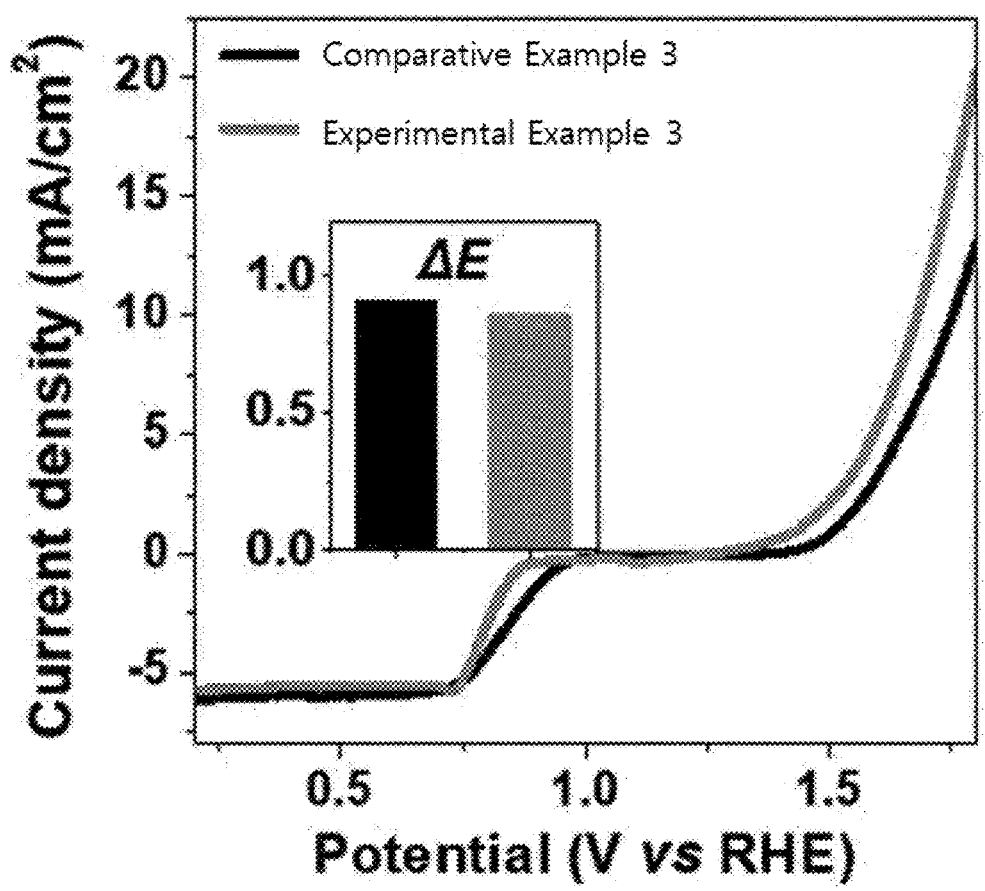
FIG. 31 is a view showing a polarization curve for a metal-carbon composite catalyst mixture according to the embodiment of the present invention.

FIG. 31 is a view showing a polarization curve for a metal-carbon composite catalyst mixture according to the embodiment of the present invention.

Referring to FIG. 31, as described above with reference to FIG. 30, the current densities subject to potentials of the mixture of the metal-carbon composite catalysts used in the oxygen reduction reaction and the oxygen evolution reaction are confirmed.

As shown in FIG. 31, it can be seen that the metal-carbon composite catalyst mixture according to Experimental Example 3 (that is, the mixture of the metal-carbon composite catalysts according to Experimental Examples 1-2 and 1-3) has a high current density subject to a potential, compared to the metal-carbon composite catalyst mixture according to Comparative Example 3 (that is, the mixture of the metal-carbon composite catalysts according to Comparative Examples 1-1 and 1-2).

Referring to the drawing inserted in FIG. 31, differences between overpotentials in the oxygen evolution reaction (OER) of the metal-carbon composite catalyst mixtures according to Comparative Example 3 and Experimental Example 3 at a current density of 10 mA/cm2 and half-wave potentials in the oxygen reduction reaction (ORR) are confirmed. Accordingly, it can be seen that catalytic characteristics for the oxygen evolution reaction and the oxygen reduction reaction of the metal-carbon composite catalysts according to Comparative Example 3 and Experimental Example 3 are similar to each other.

Hereinafter, characteristic evaluation results on the zinc-air battery according to specific experimental examples of the present invention will be described.

The zinc-air battery is prepared as shown in FIG. 7 by using metal-carbon composite catalysts according to the above-described Comparative Examples 1-1 and 1-2 and Experimental Examples 1-2 and 1-3 as a catalyst layer for the positive electrode of the zinc-air battery. In other words, the zinc-air batteries according to Comparative Examples 2-1 and 2-2 and Experimental Examples 2-2 and 2-3 are prepared by using the metal-carbon composite catalysts according to Comparative Examples 1-1 and 1-2, and Experimental Examples 2-2 and 2-3, respectively.

In addition, the zinc-air batteries according to Comparative Example 4 and Experimental Example 4, are prepared by using the above-described metal-carbon composite catalyst mixtures according to Comparative Example 3 and Experimental Example 3, respectively.

Figure 32:
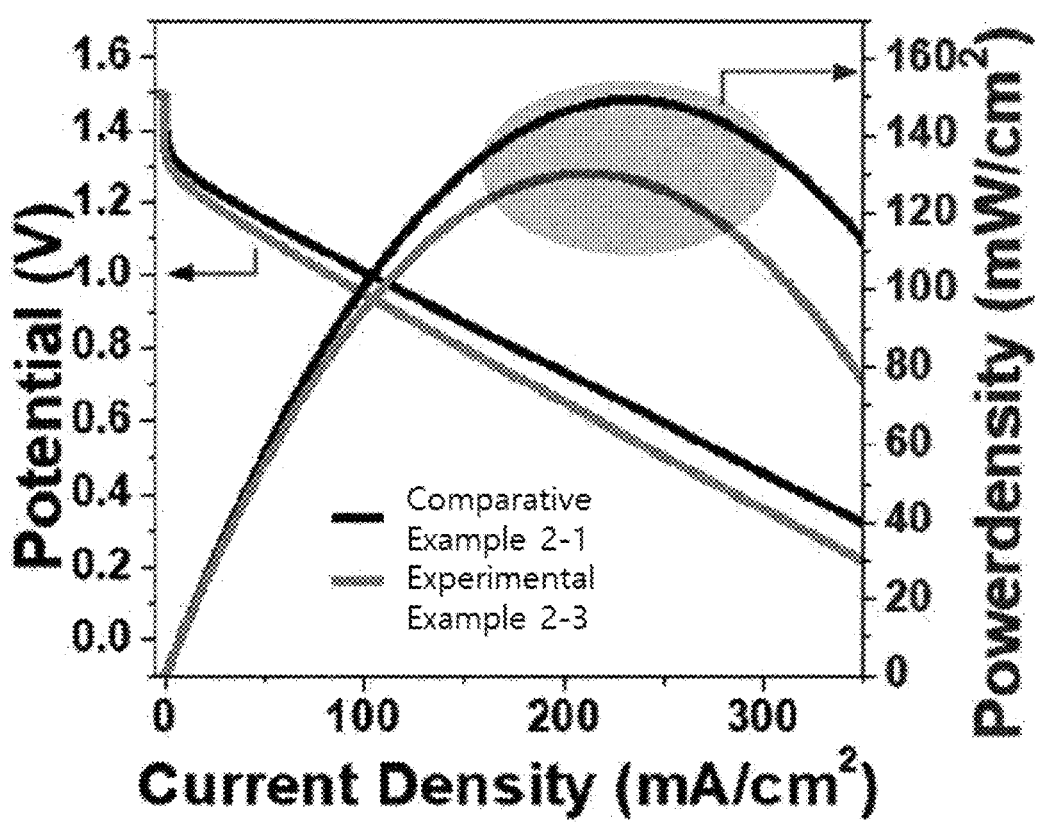
FIG. 32 is a view showing an electric potential and a power density according to a discharge current density of the zinc-air battery according to the embodiment of the present invention.

FIG. 32 is a view showing an electric potential and a power density according to a discharge current density of the zinc-air battery according to the embodiment of the present invention.

Referring to FIG. 32, as described above with reference to FIG. 30, the zinc-air battery according to Experimental Example 2-3 is prepared by using the metal-carbon composite catalyst according to Experimental Example 1-3 exhibiting a high activity of the oxygen reduction reaction.

As described above with reference to FIG. 30, it can be seen that the zinc-air battery according to Experimental Example 2-3 has a relatively lower potential and a lower power density compared to the zinc-air battery according to Comparative Example 2-1.

Figure 33:
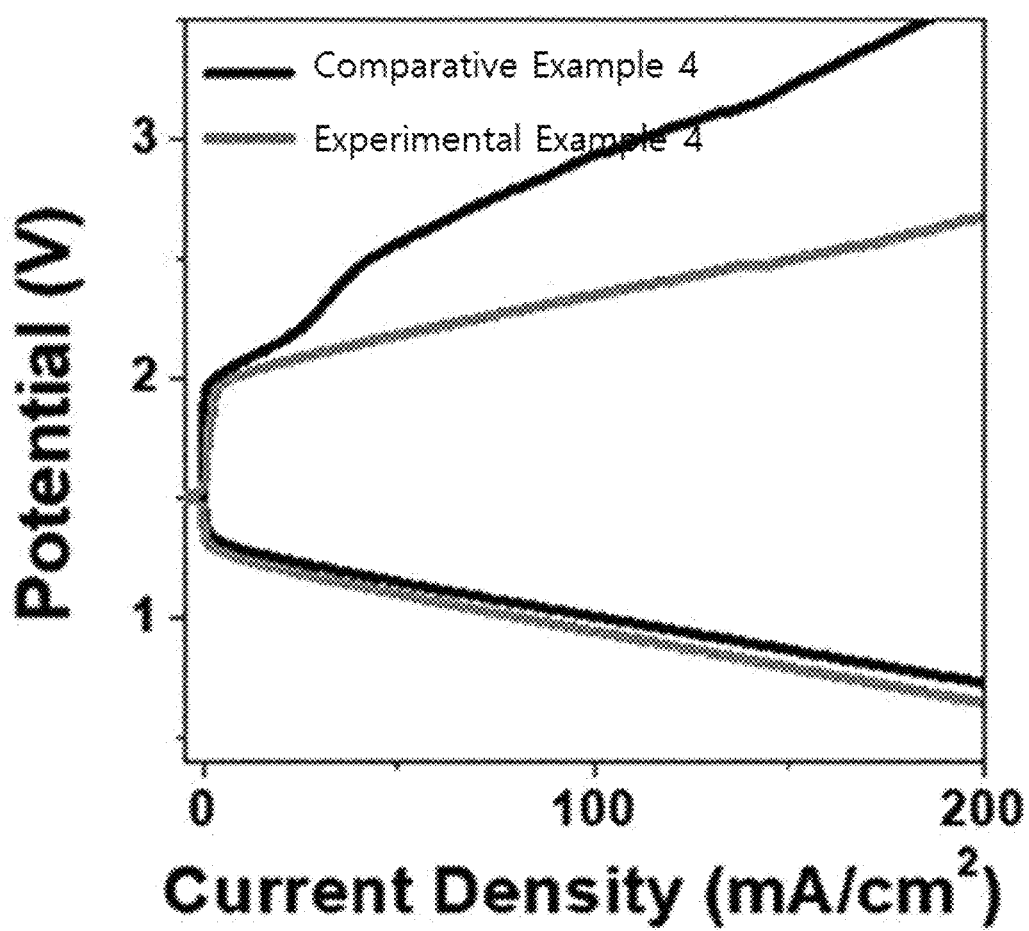
FIG. 33 is a view showing charge and discharge curves of a zinc-air battery including a metal-carbon composite catalyst mixture according to the embodiment of the present invention.

FIG. 33 is a view showing charge and discharge curves of a zinc-air battery including a metal-carbon composite catalyst mixture according to the embodiment of the present invention.

Referring to FIG. 33, the charging and discharging curves, of a zinc-air battery (Comparative Example 4) including the metal-carbon composite catalyst mixture according to Comparative Example 3 described above with reference to FIG. 30, and a zinc-air battery (Experimental Example 4) including the metal-carbon composite catalyst mixture according to Experimental Example 3, are confirmed.

As described above with reference to FIG. 32, it can be seen that the zinc-air battery according to Experimental Example 4 has a lower potential than the zinc-air battery according to Comparative Example 4.

Figure 34:
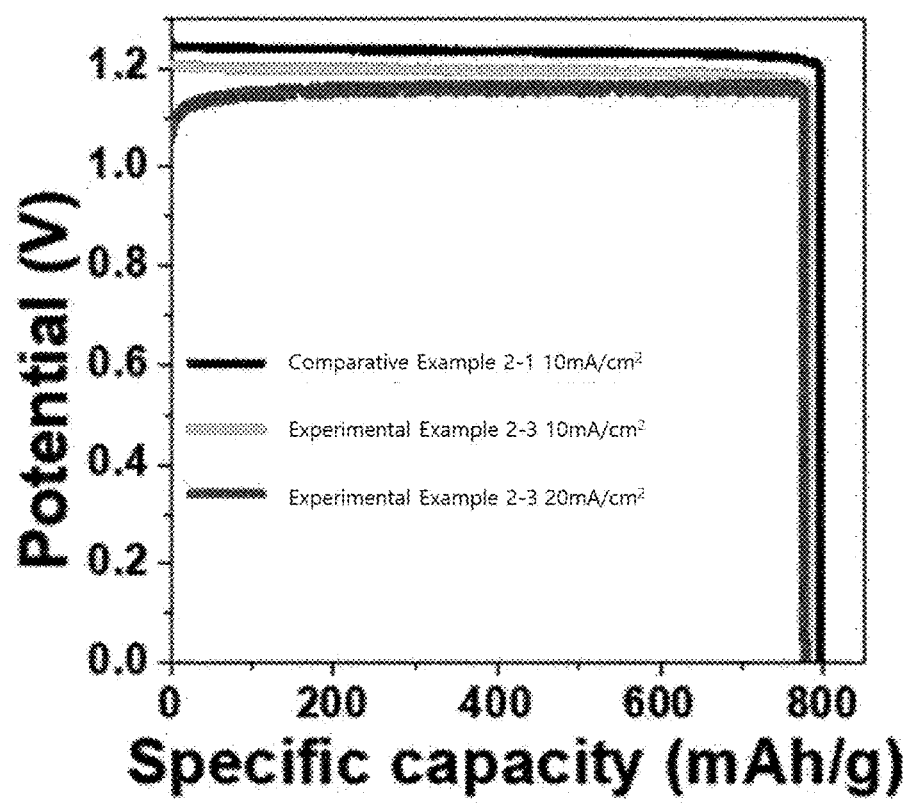
FIG. 34 is a view showing a specific capacity to a discharge current of the zinc-air battery according to the embodiment of the present invention.

FIG. 34 is a view showing a specific capacity to a discharge current of the zinc-air battery according to the embodiment of the present invention.

Referring to FIG. 34, specific capacities and potentials according to discharge currents of the zinc-air batteries according to Comparative Example 2-1 and Experimental Example 2-3 of the present invention are confirmed.

As shown in FIG. 34, it is confirmed that the zinc-air batteries according to Comparative Example 2-1 and Experimental Example 2-3 exhibit 800 mAh/g and 792 mAh/g for the same current density, respectively. Accordingly, it can be seen that the zinc-air batteries according to Comparative Example 2-1 and Experimental Example 2-3 have similar specific capacities and potentials.

In addition, it is confirmed that the zinc-air battery according to Experimental Example 2-3 has a lower specific capacity and a lower potential as the current density is higher.

Figure 35:
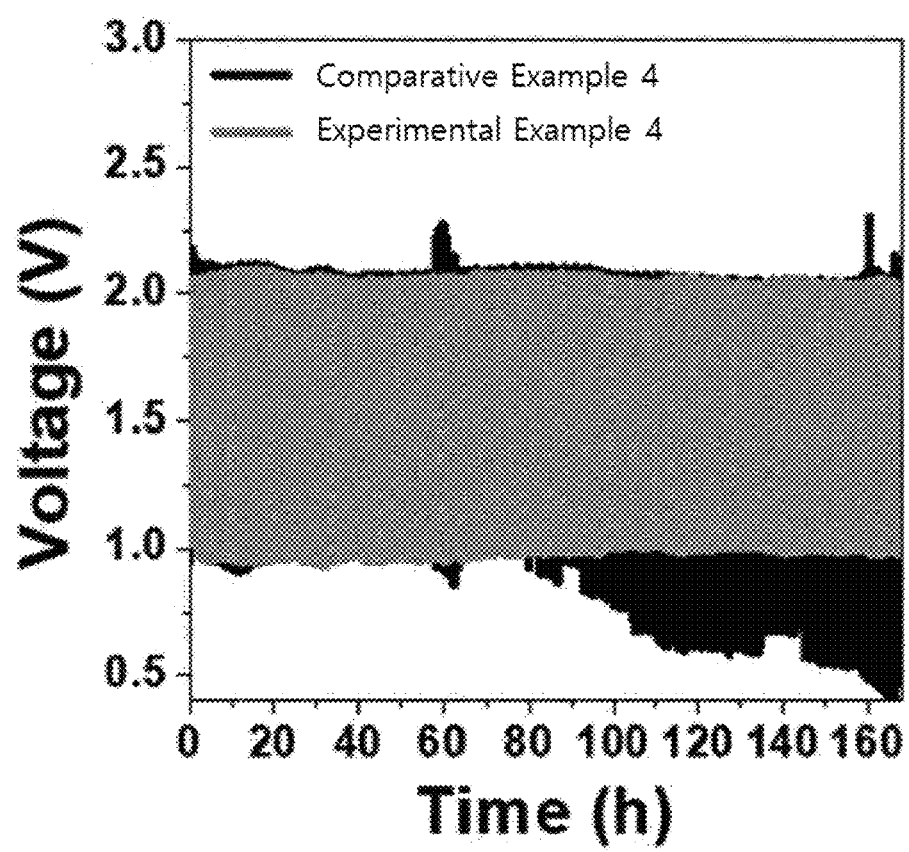
FIGS. 35 and 36 are views showing the stability for repeated charging and discharging of the zinc-air battery including the metal-carbon composite catalyst mixture according to the embodiment of the present invention.
Figure 36:
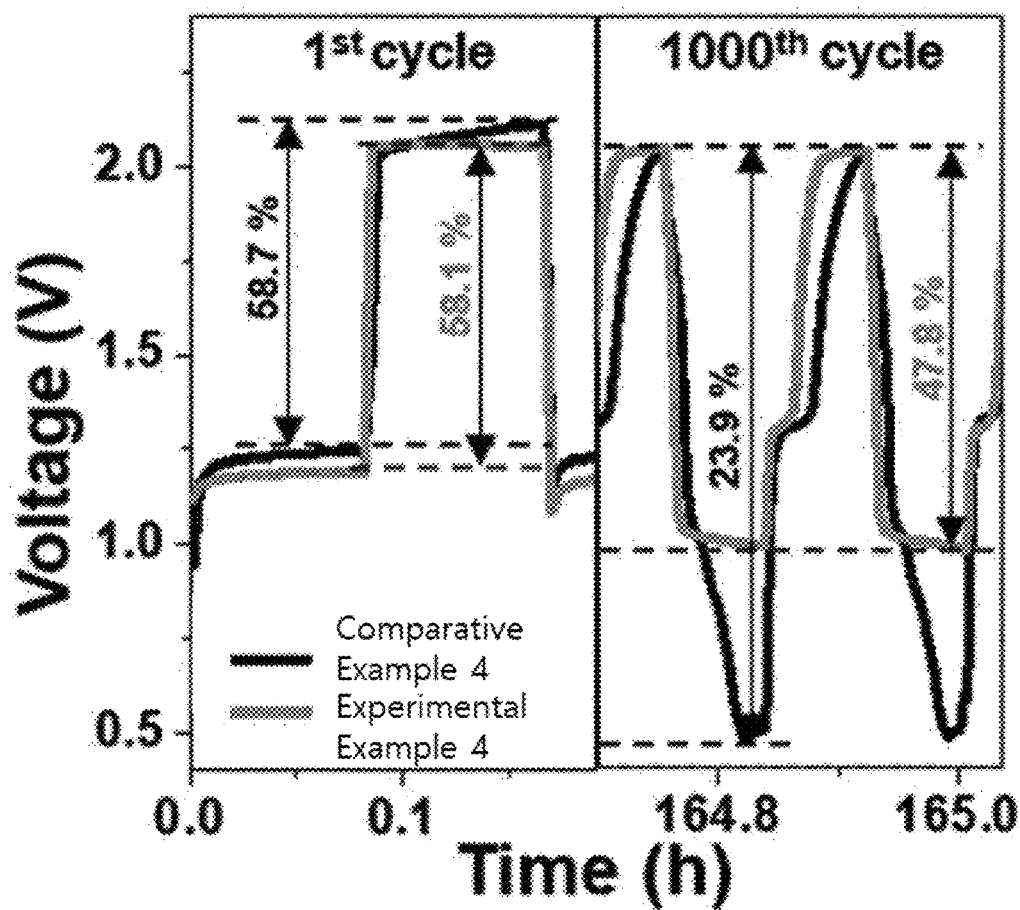

FIGS. 35 and 36 are views showing the stability for repeated charging and discharging of the zinc-air battery including the metal-carbon composite catalyst mixture according to the embodiment of the present invention.

Referring to FIGS. 35 and 36, charging and discharging characteristics according to time of the zinc-air battery according to Comparative Example 4 described above with reference to FIG. 36 and the zinc-air battery according to Experimental Example 4 are confirmed.

As described above with reference to FIG. 30, it can be seen that the zinc-air battery according to Experimental Example 4 has a higher stability according to time than the zinc-air battery according to Comparative Example 4.

Although the present invention has been described in detail using the exemplary embodiments, the scope of the present invention is not limited to the specific embodiments, and will be interpreted by the appended claims. In addition, it will be apparent that a person having ordinary skill in the art may carry out various defamations and modifications for the embodiments described as above within the scope without departing from the present invention.

INDUSTRIAL APPLICABILITY

The metal-carbon composite catalysts according to an embodiment of the present application may be used as a catalyst for a zinc-air battery and a fuel battery.

The invention claimed is:

1. A method for preparing a metal-carbon composite catalyst, the method comprising:
   providing for a source material including a monomer containing N-methyl-2-pyrrolidone (NMP) and a metal precursor;
   heat treating the source material to prepare an intermediate product; and
   carbonizing the intermediate product to prepare a carbon nanocatalyst in which a metal of the metal precursor is coupled to a carbon matrix structure,
   wherein the carbon matrix structure has a carbon sheet configuration, and
   wherein the metal includes at least one of metal ions or metal particles.

2. The method of claim 1, wherein,
   the source material does not include an organic additive,
   the carbon matrix structure has a configuration in which a plurality of nitrogen-doped carbon sheets are laminated, and
   the metal includes metal ions bonded to nitrogen of the nitrogen-doped carbon sheets.

3. The method of claim 1, wherein
   the source material includes an organic additive,
   the organic additive includes 4-aminopyridine,
   the carbon matrix structure includes a nitrogen-doped carbon sheet, and
   the metal includes the metal particles bonded to nitrogen of the nitrogen-doped carbon sheet.

4. The method of claim 1, wherein
   the source material includes an organic additive,
   the organic additive includes pyrrole-2-carboxylic acid,
   the metal precursor includes cobalt sulfate ($CoSO_4$),
   the carbon matrix structure includes a carbon porous body having a configuration of nitrogen-doped porous carbon spheres, and
   the metal includes the metal ions bonded to nitrogen of the nitrogen-doped porous carbon spheres.

5. The method of claim 1, wherein
   the source material includes an organic additive,
   the organic additive includes pyrrole-2-carboxylic acid,
   the metal precursor includes cobalt cyanide ($Co(CN)_2$),
   the carbon matrix structure includes a carbon porous body having a configuration of a nitrogen-doped porous carbon sponge, and
   the metal includes the metal particles bonded to nitrogen of the nitrogen-doped porous carbon sponge.

6. The method of claim 1, wherein preparing of the intermediate product includes:
   heat treating the source material in an oxygen atmosphere to prepare a radical reaction initiator from the monomer by using oxygen as a medium; and
   preparing the intermediate product with a radical polymerization reaction by the radical reaction initiator.

7. The method of claim 1, wherein the monomer includes an organic additive containing at least one of 4-aminopyridine or pyrrole-2-carboxylic acid.

8. The method of claim 1, wherein the metal precursor includes at least one of cobalt sulfate ($CoSO_4$), nickel sulfate ($NiSO_4$), manganese sulfate ($MnSO_4$), iron sulfate ($FeSO_4$) or cobalt cyanide ($Co(CN)_2$).

* * * * *